US012192376B2

(12) United States Patent
Lu et al.

(10) Patent No.: US 12,192,376 B2
(45) Date of Patent: Jan. 7, 2025

(54) METHOD AND APPARATUS FOR REALIZING SECURE SIGNATURE

(71) Applicant: Feitian Technologies Co., Ltd., Beijing (CN)

(72) Inventors: Zhou Lu, Beijing (CN); Huazhang Yu, Beijing (CN)

(73) Assignee: Feitian Technologies Co., Ltd., Beijing (CN)

( * ) Notice: Subject to any disclaimer, the term of this patent is extended or adjusted under 35 U.S.C. 154(b) by 519 days.

(21) Appl. No.: 17/546,692

(22) Filed: Dec. 9, 2021

(65) Prior Publication Data

US 2022/0103376 A1  Mar. 31, 2022

Related U.S. Application Data

(63) Continuation of application No. PCT/CN2020/084238, filed on Apr. 10, 2020.

(30) Foreign Application Priority Data

Jun. 11, 2019 (CN) .......................... 201910503324.X

(51) Int. Cl.
  *H04L 29/06* (2006.01)
  *H04L 9/08* (2006.01)
  *H04L 9/32* (2006.01)

(52) U.S. Cl.
  CPC .......... *H04L 9/3247* (2013.01); *H04L 9/0861* (2013.01); *H04L 9/3236* (2013.01)

(58) Field of Classification Search
  CPC .................. H04L 9/3247; H04L 9/0861; H04L 9/3236; H04L 9/0891; H04L 9/3226; H04L 9/3242; H04L 9/0643; H04L 9/0825
  See application file for complete search history.

(56) References Cited

U.S. PATENT DOCUMENTS 9,191,375 B2 * 11/2015 Kaler ...................... G06F 21/41
9,819,648 B1 * 11/2017 Chilakapati ........... H04L 63/045
(Continued)

FOREIGN PATENT DOCUMENTS

CN  101129018 A  *  2/2008  .......... H04L 9/3013
CN  101149774 A  *  3/2008  .......... G06F 21/572
(Continued)

OTHER PUBLICATIONS

International Search Report issued on Jul. 1, 2020, in International Application No. PCT/CN2020/084238; 4 pages (with English Translation).
Chinese Office Action issued on Mar. 2, 2021, in corresponding Chinese Application No. 201910503324.X; 10 pages.
(Continued)

*Primary Examiner* — Sher A Khan
(74) *Attorney, Agent, or Firm* — Maier & Maier, PLLC

(57) ABSTRACT

A method and apparatus for realizing secure signature, the method includes: when a PIN verification instruction is received, verifying a first calculation result in the instruction by using a second shared key generated according to a terminal public key and a signature module private key, if the verifying is failed, replacing a stored signature module key pair with a regenerated signature module key pair; otherwise, generating PIN verification signature data and storing the PIN verification signature data, generating a second calculation result according to a second shared key and the PIN verification signature data and sending the second calculation result to the terminal; when a signature operation instruction is received, determining whether the PIN verification signature data in the instruction is consistent with the stored PIN verification signature data, if yes, signing an intermediate data to be signed by using a signature private key.

20 Claims, 22 Drawing Sheets

(56) References Cited

U.S. PATENT DOCUMENTS

| | | | |
|---|---|---|---|
| 10,242,367 B1* | 3/2019 | Koeppel | G06Q 20/3552 |
| 2002/0150241 A1* | 10/2002 | Scheidt | H04L 9/3033 |
| | | | 713/180 |
| 2003/0014372 A1* | 1/2003 | Wheeler | H04L 9/3231 |
| | | | 705/71 |
| 2008/0211624 A1* | 9/2008 | Micali | H04L 9/007 |
| | | | 340/5.6 |
| 2009/0235339 A1* | 9/2009 | Mennes | H04L 9/3273 |
| | | | 726/5 |
| 2010/0031021 A1* | 2/2010 | Arnold | H04L 9/0822 |
| | | | 713/190 |
| 2010/0169399 A1* | 7/2010 | Moroney | H04N 21/43615 |
| | | | 708/250 |
| 2010/0242102 A1 | 9/2010 | Cross et al. | |
| 2013/0010955 A1* | 1/2013 | Lu | H04L 9/00 |
| | | | 380/255 |
| 2013/0198519 A1* | 8/2013 | Marien | H04L 9/3234 |
| | | | 713/172 |
| 2013/0333011 A1* | 12/2013 | Quigley | G06Q 20/322 |
| | | | 726/7 |
| 2014/0196134 A1* | 7/2014 | Yamaguchi | G06F 21/44 |
| | | | 726/7 |
| 2015/0124963 A1* | 5/2015 | McCusker | H04L 9/0847 |
| | | | 380/46 |
| 2016/0105414 A1* | 4/2016 | Bringer | H04L 9/3247 |
| | | | 713/168 |
| 2018/0152297 A1* | 5/2018 | Fielding | H04L 9/3239 |

FOREIGN PATENT DOCUMENTS

| | | | | | |
|---|---|---|---|---|---|
| CN | 100470572 | C | * | 3/2009 | |
| CN | 101807237 | A | | 8/2010 | |
| CN | 101861742 | B | * | 7/2013 | H04L 63/0823 |
| CN | 104104505 | A | | 10/2014 | |
| CN | 105553672 | A | | 5/2016 | |
| CN | 105871557 | A | * | 8/2016 | H04L 51/22 |
| CN | 106656504 | A | | 5/2017 | |
| CN | 106797317 | A | * | 5/2017 | G06F 21/575 |
| CN | 106899413 | A | | 6/2017 | |
| CN | 106921497 | A | | 7/2017 | |
| CN | 108881310 | A | | 11/2018 | |
| CN | 110190950 | A | | 8/2019 | |
| EP | 1054364 | A2 | | 11/2000 | |
| EP | 3292654 | B1 | * | 8/2019 | H04L 9/3226 |
| GB | 2333878 | A | * | 8/1999 | G06Q 20/02 |
| JP | 2009140057 | A | * | 6/2009 | G06F 19/328 |
| KR | 20070096073 | A | | 10/2007 | |
| WO | WO-2005029292 | A1 | * | 3/2005 | G06F 21/645 |

OTHER PUBLICATIONS

Li Yan Zhang Rong, "Research on digital signature technology based on user card"; China Academic Journal Electronic Publishing House; Nov. 15, 2016, 6 pages; https://url.emailprotection.link/?bl7S_j23LDoE_DrADMCpUk7ocJeHIJKzgy6K7kjN2R6mdJ-lo0h_vyZLexc4AbpF-dnYN9aTFdbODk36TKSS30w~~ (with English Abstract).

* cited by examiner

CONT. FROM
FIG. 2B
CONT. FROM
FIG. 2B
216: the signature module performs hash operation on the password intermediate value to obtain the hash result, intercepts data in the first 16 bytes of the hash result and stores the intercepted data as a PIN code, and sets the number of PIN code retries as an initial value, ends
FIG. 2C

CONT. FROM
FIG. 6B

CONT. FROM
FIG. 6B

615: the signature module set a PIN verification signature identification, generates a first random number as the PIN verification signature data and stores the PIN verification signature data, encrypts the PIN verification signature data by using the second shared key to obtain a ciphertext data, and returns the ciphertext data to the terminal, and modifies the number of PIN code retries to the initial value ◄——— Yes ——— 611: the signature module determines whether the second result data is with the same as the intercepted data No ↓

612: the signature module regenerates the signature module key pair and replaces the stored signature module key pair with the regenerated signature module key pair, and updates the number of PIN code retries Prompts the PIN code is locked ◄——— Yes ——— 613: the signature module determines whether the number of PIN code retries is equal to the predetermined data No ↓

Prompts the verified message of the PIN code is incorrect ◄——— Yes ——— 614: the signature module determines whether the verification of the PIN code is failed for three consecutive times ——— No ——► Prompts the input PIN code is incorrect

FIG. 6C

METHOD AND APPARATUS FOR REALIZING SECURE SIGNATURE

CROSS-REFERENCE TO RELATED APPLICATIONS

This application is a continuation of the International Application No. PCT/CN2020/084238, filed on Apr. 10, 2020, which claims the priority of a Chinese Patent Application No. 201910503324.X, entitled "METHOD AND APPARATUS FOR REALIZING SECURE SIGNATURE" filed to the China National Intellectual Property Administration on Jun. 11, 2019, both of the aforementioned applications are hereby incorporated by reference in their entireties.

TECHNICAL FIELD

The present application relates to the field of information security, more specifically, to a method and apparatus for realizing secure signature.

BACKGROUND

With the development of information security, a smart key device signature module becomes more and more popular in the security field, a user can protect the security of user information via signing on transmission massage by using a signature module (such as the smart key device).

In the prior art, first confirming whether a user's identity is legitimate via the Personal Identification Number (PIN) verification operation, and performing the signature operation on the transmission message after confirming the user's identity is legitimate.

Since the PIN verification operation and the signature operation are implemented through two independent instructions, no data relation between the PIN verification operation and the signature operation, there may be the following problems: performing the signature operation a long time after the PIN verification operation, in this process, there will be verifying PIN one time, and performing multiple signature operations, the multiple signature operations may be performed by an illegitimate user or an illegal user, which resulting in user information leakage, and the security of the signature operation cannot be guaranteed. Therefore, it is urgent to provide a more secure signature method to protect the security of the user information.

SUMMARY

The object of the present application is to provide a method and apparatus for realizing secure signature to overcome shortcomings of the prior art.

The present application provides a method for realizing secure signature, including:
step F1, when a PIN verification instruction sent by a terminal is received, generating, by a signature module, a second shared key according to a terminal public key and a stored signature module private key in the PIN verification instruction, and verifying a first calculation result in the PIN verification instruction by using the second shared key, if the verifying is successful, executing step F2; if the verifying is failed, regenerating a signature module key pair and replacing a stored signature module key pair; wherein the signature module key pair comprises a signature module private key and a signature module public key;

step F2, generating, by the signature module, PIN verification signature data and storing the PIN verification signature data, generating a second calculation result according to the second shared key and the PIN verification signature data, and sending the second calculation result to the terminal;

step H1, when a signature operation instruction sent by the terminal is received, determining, by the signature module, whether a PIN verification signature data in the signature operation instruction is consistent with the stored PIN verification signature data, if yes, executing step H2; otherwise, reporting an error;

step H2, signing, by the signature module, intermediate data to be signed in the signature operation instruction by using a stored signature private key;

step H3, determining, by the signature module, whether a current state meets a preset condition, if yes, clearing the stored PIN verification signature data, and returning a signature result to the terminal; otherwise, returning the signature result to the terminal.

Further, before the verifying the first calculation result in the PIN verification instruction by using the second shared key, the method further includes: parsing, by signature module, the received PIN verification instruction, and determining whether the parsing is successful, if yes, continuing; otherwise, reporting an error;
before the determining whether the PIN verification signature data in the signature operation instruction is consistent with the stored PIN verification signature data, step H1 further includes: parsing, by the signature module, the received signature operation instruction, and determines whether the parsing is successful, if yes, continuing; otherwise, reporting an error.

Further, the verifying the first calculation result in the PIN verification instruction by using the second shared key includes:
performing, by the signature module, decryption operation on the first calculation result in the PIN verification instruction by using the generated second shared key to obtain a second result data, obtaining an PIN code stored internally and converting the PIN code stored internally to second byte stream data, performing hash operation on the second byte stream data and intercepting data in the first 16 bytes of a hash result as intercepted data, and determining whether the intercepted data is consistent with the second result data, if yes, the verifying is successful; otherwise, the verifying is failed.

Further, the generating the second shared key according to the terminal public key in the PIN verification instruction and the stored signature module private key comprises: calculating, by the signature module, the terminal public key in the PIN verification instruction and the stored signature module private key to obtain a first calculation value, and performing hash operation on the first calculation value to obtain a first hash value and taking the first hash value as the second shared key.

Further, before the verifying the first calculation result in the PIN verification instruction according to the generated second shared key, the method further includes: determining, by the signature module, whether the number of the PIN code retries is the predetermined data, if yes, reporting an error, and prompting the PIN code is locked; otherwise, continuing the procedure.

The following steps are also included when the verification in step F1 fails:

step C1, updating, by the signature module, the number of the PIN code retries;

step C2, determining, by the signature module, whether the number of the PIN code retries is the predetermined data, if yes, prompting the PIN code is locked; otherwise, executing step C3;

step C3, determining, by the signature module, whether the verification of the PIN code is failed for three consecutive times, if yes, prompting the verified message of the PIN code is incorrect; otherwise, prompting the input PIN code is incorrect;

step F2 further includes: modifying the number of the PIN code retries as an initial value.

Further, the generating the second calculation result according to the second shared key and the PIN verification signature data, and sending the second calculation result to the terminal includes: encrypting the PIN verification signature data by using the second shared key to obtain ciphertext data, and sending the ciphertext data to the terminal.

Further, step H1 and step H2 can be replaced by:

step P1, when a secure environment setting operation instruction sent by the terminal is received, determining, by the signature module, whether a PIN verification signature data in the secure environment setting operation instruction is consistent with the stored PIN verification signature data, if yes, executing step P2; otherwise, ending;

step P2, determining, by the signature module, whether a signature setting algorithm is legitimate according to an algorithm identification (ID) and a key container ID in the secure environment setting instruction, if yes, executing step P3; otherwise, ending;

step P3, opening, by the signature module, a corresponding key container according to the key container ID, and setting a corresponding algorithm according to the algorithm ID, and returning a secure environment setting succeed response to the terminal;

step T1, when a hash operation instruction sent by the terminal is received, determining, by the signature module, whether a PIN verification signature data in the hash operation instruction is consistent with the stored PIN verification signature data, if yes, executing step T2; otherwise, ending;

step T2, parsing, by the signature module, the hash operation instruction to obtain data to be signed and storing the data to be signed;

step T3, performing, by the signature module, hash operation on the data to be signed according to a set algorithm to obtain a hash value and storing the hash value, and returning a hash operation successful response to the terminal;

step Q1, when the signature operation instruction sent by the terminal is received, determining, by the signature module, whether the PIN verification signature data in the signature operation instruction is consistent with the stored PIN verification signature data, if yes, executing step Q2; otherwise, ending;

step Q2, intercepting, by the signature module, key information from the stored data to be signed and determining whether the intercepting is successful, if yes, executing step Q3; otherwise, ending;

step Q3, displaying, by the signature module, the key information and determining whether user confirmation information is received, if yes, signing, by the signature module, the stored hash value by using a signature private key in a container corresponding to a container ID in the signature operation instruction to obtain a signature result and storing the signature result; otherwise, ending;

step Q4, determining, by the signature module, whether the current state meets the preset condition, if yes, clearing the stored PIN verification signature data, and returning signature success information to the terminal; otherwise, returning signature failure information to the terminal;

step L1, when a signature result acquisition instruction sent by the terminal is received, returning, by the signature module, the signature result to the terminal.

Further, step P2 includes:

step P21, determining, by the signature module, whether a corresponding container exists according to the key container ID, if yes, executing step P22; otherwise, ending the procedure;

step P22, determining, by the signature module, whether a corresponding algorithm is supported according to the algorithm ID, if yes, executes step P3; otherwise, ends the procedure.

Further, step T3 further includes returning, by the signature module, the hash value to the terminal.

Further, step F2 further includes setting the PIN verification signature identification as valid;

step H1, step P1, step T1 and step Q1 further include determining, by the signature module, whether the PIN verification signature identification is valid, if yes, continuing the procedure; otherwise, reporting an error;

when it is determined as yes in step H3, the method further includes setting the PIN verification signature identification as invalid.

Further, the setting the PIN verification signature identification as valid specifically is setting the PIN verification signature identification;

the determining whether the PIN verification signature identification is valid specifically is determining whether the PIN verification signature identification is set;

the setting the PIN verification signature identification as invalid specifically is resetting the PIN verification signature identification.

Further, step F2 further includes setting the number of times of signature as an initial value;

determining, by the signature module, whether the current state meets the preset condition includes: updating the number of times of signature, and determining whether the number of times of signature equals to the preset value, if yes, the current state meets the preset condition; otherwise, the current state does not meet the preset condition.

Further, step F2 further includes setting signature valid time;

determining, by the signature module, whether the current state meets the preset condition includes determining whether the current time is within the signature valid time, if yes, the current state does not meet the preset condition; otherwise, the current state meets the preset condition.

Further, the method further includes:

when the PIN code setting instruction is received, determining, by the signature module, whether the PIN code is set, if yes, reporting an error; otherwise, verifying the PIN code setting instruction, if the verifying is successful, generating the PIN code and storing the PIN code according to the first ciphertext in the PIN code setting instruction; if the verifying is failed, ending the procedure.

Further, the verifying, by the signature module, the PIN code setting instruction includes:

step M1, calculating, by the signature module, the stored signature module private key and the terminal public key in the PIN code setting instruction to obtain a first calculation value, and performing hash operation on the first calculation value, and taking a hash value as the second shared key;

step M2, performing, by the signature module, HMAC operation on the first ciphertext in the PIN code setting instruction by using the second shared key to obtain a second operation result, intercepting data in the first 16 bytes of the second operation result to obtain intercepted data;

step M3, determining, by the signature module, whether the intercepted data is consistent with the first result data in the PIN code setting instruction, if yes, the verifying is successful; otherwise, the verifying is failed.

Further, before step M1, the method further includes:

parsing, by the signature module, the received PIN code setting instruction, and determining whether the PIN code setting instruction is parsed successfully, if yes, executing step M1; otherwise, reporting an error.

Further, the generating the PIN code according to the first ciphertext in the PIN code setting instruction and storing the PIN code includes:

step N1, decrypting, by the signature module, the first ciphertext in the PIN code setting instruction by using the second shared key to obtain a first decrypted value, removing padding data in the first decrypted value to obtain a password intermediate value;

step N2, determining, by the signature module, whether the password intermediate value is less than a first preset value, if yes, reporting an error; otherwise, executing step N3;

step N3, performing, by the signature module, hash operation on the password intermediate value to obtain a hash result, and intercepting data in the first 16 bytes of the hash result and storing the intercepted data as the PIN code.

Further, the method further includes:

when the PIN code modifying instruction, verifying, by the signature module, the PIN code modifying instruction, and replacing the stored PIN code with the PIN code in the PIN code modifying instruction if the verifying is successfully; reporting an error if the verifying is failed.

Further, the verifying the PIN code modifying instruction includes:

step W1, calculating, by the signature module, the stored signature module private key and the terminal public key in the PIN code modifying instruction to obtain a first result data, and performing hash operation on the first result data to obtain a second shared key; and splicing a first encrypted value in the PIN code modifying instruction with a second encrypted value in the PIN code modifying instruction to obtain a second spliced result;

step W2, performing, by the signature module, HMAC operation on the second spliced result by using the second shared key to obtain the second operation result, and intercepting data in the first 16 bytes from the second operation result to obtain the intercepted data;

step W3, determining, by the signature module, whether the intermediate data in the PIN code modifying instruction is consistent with the intercepted data, if yes, executing step W4; otherwise, reporting an error;

step W4, decrypting, by the signature module, the first encrypted value by using the second shared key to obtain a first decrypted value;

step W5, determining, by the signature module, whether the first decrypted value is consistent with the PIN code stored internally, if yes, the verification is successful; otherwise, the verification is failed, and the signature module key pair is regenerated and the stored signature module key pair is replaced.

Further, the replacing the stored PIN code with the PIN code in the PIN code modifying instruction includes:

step K1, decrypting, by the signature module, the second encrypted value by using the second shared key to obtain a second decrypted value, removing the padding data from the second decrypted value to obtain a first intermediate value;

step K2, determining, by the signature module, whether the length of the first intermediate value is less than the first preset value, if yes, executing step K3; otherwise, reporting an error;

step K3, performing, by the signature module, hash operation on the first intermediate value to obtain a hash result, and intercepting data in the first 16 bytes of the hash result and replacing the PIN code stored internally.

Further, before step W1, the method further includes:

parsing, by the signature module, the received PIN code modifying instruction, and determining whether the PIN code modifying instruction is parsed successfully, if yes, executing step W1; otherwise, reporting an error.

Further, step N3 further includes setting, by the signature module, the number of PIN code retries as an initial value;

step K3 further includes modifying, by the signature module, the number of PIN code retries into the initial value;

before step W1, the method further includes: determining, by the signature module, whether the number of PIN code retries is the predetermined data, if yes, prompts the PIN code is locked; otherwise, executes step W1;

after the verification in step W5 fails, the method further includes: step W6, updating, by the signature module, the number of PIN code retries;

step W7, determining, by the signature module, whether the number of PIN code retries is the predetermined data, if yes, prompting the PIN code is locked; otherwise, executing step W8;

step W8, determining, by the signature module, whether the verification of the PIN code is failed for three consecutive times, if yes, prompting the verified message of the PIN code is incorrect; otherwise, prompting the input PIN code is incorrect.

Further, the method further includes:

when a PIN verification signature data acquisition instruction is received, verifying, the signature module, the PIN verification signature data acquisition instruction, and generating the PIN verification signature data and sending the PIN verification signature data to the terminal if the verifying is successfully; and ending the procedure if the verifying is failed.

Further, the verifying the PIN verification signature data acquisition instruction comprises:

step R1, calculating, by the signature module, a terminal public key in the PIN verification signature data acquisition instruction and the stored signature module private key to obtain a first calculation value, performing hash operation on the first calculation value to obtain a first hash value and taking the first hash value as the second shared key;

step R2, performing, by the signature module, decryption operation on a first calculation result in the PIN verification signature data acquisition instruction by using the second shared key to obtain second result data, obtaining a PIN code stored internally, and converting the PIN code stored internally to byte stream data, performing hash operation on the byte stream data and intercepting data in the first 16 bytes of a hash result to obtain intercepted data;

step R3, determining, by the signature module, whether the second result data is consistent with the intercepted data, if yes, the verifying is successful; otherwise, the verifying is failed, and regenerating a signature module key pair and replacing the stored signature module key pair.

Further, the generating the PIN verification signature data and sending the PIN verification signature data to the terminal comprises: generating a first random number as the PIN verification signature data, encrypting the PIN verification signature data by using the second shared key to obtain ciphertext data, and returning the ciphertext data to the terminal.

Further, before step R1, the method further includes:

step R0, parsing, by the signature module, the received PIN verification signature data acquisition instruction, and determining whether the PIN verification signature data acquisition instruction is parsed successfully, if yes, executing step R1; otherwise, reporting an error.

Further, step N3 further includes setting, by the signature module, the number of PIN code retries as the initial value;

when the verification in step R3 is successful, the method further includes modifying, by the signature module, the number of PIN code retries to the initial value;

before step R1, the method further includes determining, by the signature module, whether the number of PIN code retries is the predetermined data, if yes, prompting the PIN code is locked; otherwise, executing step R1;

when the determination result in step R3 is negative, the method includes:

step R4, updating, by the signature module, the number of PIN code retries;

step R5, determining, by the signature module, whether the number of PIN code retries is the predetermined data, if yes, prompting the PIN code is locked; otherwise, executing step R6;

step R6, determining, by the signature module, whether the verification of the PIN code is failed for three consecutive times, if yes, prompting the verified message of the PIN code is incorrect; otherwise, prompting the input PIN code is incorrect.

Further, the method further includes:

when a shared key negotiation instruction is received, generating, by the signature module, the signature module key pair and stores the signature module key pair, and returning the signature module public key in the signature module key pair to the terminal.

The present application also provides an apparatus for realizing secure signature, including a signature module, the signature module includes:

a receiving sub-module, configured to receive a PIN verification instruction and a signature operation instruction which are sent by a terminal;

a first generating sub-module, configured to generate a second shared key according to a terminal public key in the PIN verification instruction and a stored signature module private key when the verifying PIN code instruction is received by the receiving sub-module;

a first verifying sub-module, configured to verify a first calculation result in the PIN verification instruction by using a second shared key generated by the first generating sub-module, trigger a third generating sub-module if the verification is successful; and trigger a second generating sub-module if the verification is failed;

the second generating sub-module, configured to regenerate a signature module key pair and replace a stored signature module key pair; wherein the signature module key pair comprises a signature module private key and a signature module public key;

the third generating sub-module, configured to generate PIN verification signature data and store the PIN verification signature data; and to generate a second calculation result according to the second shared key generated by the first generating sub-module and the PIN verification signature data;

a first determining sub-module, configured to determine whether the PIN verification signature data in the signature operation instruction is consistent with stored PIN verification signature data when the signature operation instruction is received by the receiving sub-module, if yes, trigger a signing sub-module; otherwise, report an error;

the signing sub-module is configured to sign intermediate data to be signed in the signature operation instruction by using a stored signature private key;

a clear determining sub-module, configured to determine whether a current state meets a preset condition, if yes, to clear the stored PIN verification signature data;

a sending sub-module, configured to send the second calculation result generated by the third generating sub-module to the terminal, and further configured to send a signature result obtained by the signing sub-module to the terminal when the clear determining sub-module makes a positive determination or a negative determination.

Further, the signature module further includes:

a first parsing sub-module, configured to parse the PIN verification instruction received by the receiving sub-module, and determine whether the PIN verification instruction is parsed successfully, if yes, trigger the first verifying sub-module; otherwise, report an error;

a second parsing sub-module, which is configured to parse the signature operation instruction received by the receiving sub-module, and determine whether the signature operation instruction is parsed successfully, if yes, trigger the first determining sub-module; otherwise, report an error.

Further, the first verifying sub-module is specifically configured to perform decryption operation on the first calculation result in the PIN verification instruction by using the generated second shared key to obtain a second result data, obtain a stored PIN code, and convert the stored PIN code into second byte stream data, perform hash operation on the second byte stream data and intercept data in the first 16 bytes of a hash result as intercepted data, and determine whether the intercepted data is consistent with the second result data, if yes, the verification is successful, and trigger the third generating sub-module; otherwise, the verification is failed, and trigger the second generating sub-module.

Further, the first generating sub-module is specifically configured to calculate the terminal public key in the PIN verification instruction and the stored signature module private key to obtain a first calculation value, and perform hash operation on the first calculation value to obtain a first hash value and take the first hash value as the second shared key.

Further, the signature module further includes:
a second determining sub-module, configured to determine whether the number of PIN code retries is the predetermined data, if yes, report an error, prompt the PIN code is locked; otherwise, trigger the first verifying sub-module;
a first updating sub-module, configured to update the number of PIN code retries after the verification performed by the first verifying sub-module fails;
a third determining sub-module, configured to determine whether the number of PIN code retries is the predetermined data, if yes, prompt the PIN code is locked; otherwise, trigger a fourth determining sub-module;
the fourth determining sub-module, configured to determine whether the verification of the PIN code is failed for three consecutive times, if yes, prompt the verified message of the PIN code is incorrect; otherwise, prompt the input PIN code is incorrect;
a first modifying sub-module, configured to modify the number of PIN code retries to an initial value after the verification performed by the first verifying sub-module is successful.

Further, the third generating sub-module is specifically configured to encrypt the PIN verification signature data by using the second shared key to obtain a ciphertext data, and take the ciphertext data as the second calculation result.

Further, the receiving sub-module is further configured to receive the secure environment setting operation instruction, the hash operation instruction and the signature result acquisition instruction which are sent by the terminal;
the signature module further includes:
a fifth determining sub-module, configured to determine whether PIN verification signature data in the secure environment setting operation instruction is consistent with the stored PIN verification signature data when the secure environment setting operation instruction is received by the receiving sub-module, if yes, trigger a sixth determining sub-module; otherwise, end;
the sixth determining sub-module is configured to determine whether a signature setting algorithm is legitimate according to an algorithm ID in the secure environment setting instruction and a key container ID, if yes, trigger an opening and setting sub-module; otherwise, end;
the opening and setting sub-module is configured to open a corresponding key container according to the key container ID, and setting a corresponding algorithm according to the algorithm ID;
a seventh determining sub-module, configured to determine whether the PIN verification signature data in the hash operation instruction is consistent with the stored PIN verification signature data when the hash operation instruction is received by the receiving sub-module, if yes, trigger a parsing and storing sub-module; otherwise, end;
the parsing and storing sub-module is configured to parse the hash operation instruction to obtain data to be signed and store the data to be signed;

a hash operation sub-module, configured to perform hash operation on the data to be signed according to a setting algorithm to obtain a hash value and store the hash value;
the intercepting and determining sub-module is configured to intercept key information from the stored data to be signed and determine whether the key information is intercepted successfully when the first determining sub-module makes a positive determination, if yes, trigger a displaying and determining sub-module; otherwise, end;
the displaying and determining sub-module is configured to display the key information intercepted by the intercepting and determining sub-module, and to determine whether user confirmation is received, if yes, to trigger a signing sub-module; otherwise, end;
the signing sub-module is specifically configured to sign the stored hash value by using a signature private key in a container corresponding to the container ID in the signature operation instruction to obtain a signature result and store the signature result;
the sending sub-module is further configured to return a secure environment setting succeed response to the terminal after a corresponding algorithm is set by the opening and setting sub-module; further configured to return a hash calculation success response to the terminal when the operation of the hash operation sub-module is completed; further configured to return signature success information to the terminal when the clear determining sub-module makes a positive determination, and return signature failure information to the terminal when the clear determining sub-module makes a negative determination; further configured to return a signature result stored by the signing and storing sub-module to the terminal when a signature result acquisition instruction sent by the terminal is received by the receiving sub-module.

Further, the sixth determining sub-module is specifically configured to determine whether the corresponding key container exists according to the key container ID and determine whether the corresponding algorithm is supported according to the algorithm ID, if the both the determination results are positive, trigger the opening and setting sub-module; otherwise, end.

Further, the sending sub-module is further configured to return the hash value to the terminal after the hash operating sub-module finishes the operation.

Further, the third generating sub-module is further configured to set the PIN verification signature identification as valid;
the first determining sub-module is further configured to determine whether the PIN verification signature identification is valid;
the fifth determining sub-module is further configured to determine whether the PIN verification signature identification is valid;
the seventh determining sub-module is further configured to determine whether the PIN verification signature identification is valid;
the clear determining sub-module is further configured to set the PIN verification signature identification as invalid when the current state is determined to meet the preset condition.

Further, the third generating sub-module is further configured to set the PIN verification signature identification as valid; specifically is: the third generating sub-module is further configured to set the PIN verification signature identification; the first determining sub-module is further configured to determine whether the PIN verification signature identification is valid; specifically is: the first determining sub-module is further configured to determine whether the PIN verification signature identification is set;
  the fifth determining sub-module is further configured to determine whether the PIN verification signature identification is valid; specifically is: the first determining sub-module is further configured to determine whether the PIN verification signature identification is set;
  the seventh determining sub-module is further configured to determine whether the PIN verification signature identification is valid; specifically is: the first determining sub-module is further configured to determine whether the PIN verification signature identification is set;
  the clear determining sub-module is further configured to set the PIN verification signature identification as invalid when the current state is determined to meet the preset condition, specifically is: the clear determining sub-module is further configured to reset the PIN verification signature identification when the current state is determined to meet the preset condition.

Further, the third generating sub-module is further configured to set the number of times of signature as the initial value;
  the clear determining sub-module is specifically configured to update the number of times of signature, and determine whether the number of times of signature equals to the preset value, if yes, clear the stored PIN verification signature data.

Further, the third generating sub-module is further configured to set signature valid time;
  the clear determining sub-module is specifically configured to determine whether the current time is within the signature valid time, if yes, clear the stored PIN verification signature data.

Further, the receiving sub-module is further configured to receive the PIN code setting instruction;
  the signing module further includes:
  an eighth determining sub-module, configured to determine whether the PIN code is set when the PIN code setting instruction is received by the receiving sub-module, if yes, report an error; otherwise, trigger a second verifying sub-module;
  the second verifying sub-module, configured to verify the PIN code setting instruction, and if the verification is successful, generate a PIN code according to a first ciphertext in the PIN code setting instruction and store the PIN code; and if the verification is failed, end.

Further, the second verifying sub-module specifically includes:
  a hash calculating unit, configured to calculate the stored signature module private key and the terminal public key in the PIN code setting instruction to obtain a first calculation value, and perform hash operation on the first calculation value, and take a hash result as a second shared key;
  a first operating and intercepting unit, configured to perform HMAC operation on a first ciphertext in the PIN code setting instruction by using the second shared key to obtain a second operation result, and intercept data in the first 16 bytes of the second operation result to obtain the intercepted data;
  a first determining unit, configured to perform HMAC operation on a first ciphertext in the PIN code setting instruction by using the second shared key to obtain a second operation result, and intercept data in the first 16 bytes of the second operation result to obtain the intercepted data;
  the generating and storing unit is configured to generate the PIN code according to the first ciphertext in the PIN code setting instruction and store the PIN code.

Further, the second verifying sub-module further includes:
  a first parsing and determining unit, configured to parse the received PIN code setting instruction, and determine whether the PIN code setting instruction is parsed successfully, if yes, trigger the hash calculating unit; otherwise, report an error.

Further, the generating and storing unit specifically includes:
  a decrypting and removing sub-unit, configured to decrypt the first ciphertext in the PIN code setting instruction by using the second shared key to obtain a first decrypted value, and remove padding data from the first decrypted value to obtain a password intermediate value;
  a first determining sub-unit, configured to determine whether the password intermediate value is less than a first preset value, if yes, report an error; otherwise, trigger a hash intercepting sub-unit;
  the hash intercepting sub-unit is configured to perform hash operation on the password intermediate value to obtain a hash result, and intercept data in the first 16 bytes of the hash result and store the intercepted data as the PIN code.

Further, the receiving sub-module is further configured to receive a PIN code modifying instruction;
  the signing module further includes:
  a third verifying sub-module, configured to verify the PIN code modifying instruction when the PIN code modifying instruction is received by the receiving sub-module, and trigger a replacing and storing sub-module if the verifying is successfully; and report an error if the verifying is failed;
  the replacing and storing sub-module is configured to replace the stored PIN code with the PIN code in the PIN code modifying instruction.

Further, the third verifying sub-module specifically includes:
  a calculating and splicing unit, configured to calculate the stored signature module private key and the terminal public key in the PIN code modifying instruction to obtain a first result data, perform hash operation on the first result data to obtain a second shared key; and splice the first encrypted value in the PIN code modifying instruction with the second encrypted value in the PIN code modifying instruction to obtain a second spliced result;
  a second operating and intercepting unit, configured to perform HMAC operation on the second spliced result by using the second shared key to obtain a second operation result, and intercept data in the first 16 bytes from the second operation result; a second determining unit, configured to determine whether the intermediate data in the PIN code modifying instruction is consistent with the intercepted data, if yes, trigger a first decrypting unit; otherwise, report an error;
  the first decrypting unit is configured to decrypt the first encrypted value by using the second shared key to obtain a first decrypted value;
  a third determining unit, configured to determine whether the first decrypted value is consistent with the stored PIN code, if yes, trigger a replacing and storing sub-module; otherwise, report an error, and regenerate a signature module key pair and replace the stored signature module key pair.

Further, the replacing and storing sub-module specifically includes:

a decrypting and removing unit, configured to decrypt the second encrypted value by using the second shared key to obtain a second decrypted value, and remove padding data from the second decrypted value to obtain a first intermediate value;

a fourth determining unit, configured to determine whether the length of the first intermediate value is smaller than a first preset value, if yes, trigger a hash replacing unit; otherwise, report an error;

the hash replacing unit is configured to perform hash operation on the first intermediate value to obtain a hash result, intercept data in the first 16 bytes of the hash result, and replace the stored PIN code.

Further, the third verifying sub-module further includes:

a second parsing and determining unit, configured to parse the received PIN code modifying instruction, and determine whether the PIN code modifying instruction is parsed successfully, if yes, trigger the calculating and splicing unit; otherwise, report an error.

Further, the hash intercepting sub-unit is further configured to set the number of PIN code retries as an initial value;

the hash replacing unit is further configured to modify the number of PIN code retries to the initial value;

the third verifying sub-module further includes:

a fifth determining unit, configured to determine whether the number of PIN code retries is predetermined data, if yes, prompt the PIN code is locked; otherwise, trigger the calculating and splicing unit;

a first updating and determining unit, configured to update the number of PIN code retries when the determination result of the third determining unit is positive; and determine whether the number of PIN code retries is the predetermined data, if yes, prompt the PIN code is locked; otherwise, trigger a sixth determining unit;

the sixth determining unit is configured to determine whether the verification of the PIN code is failed for three consecutive times, if yes, prompt the verified message of the PIN code is incorrect; otherwise, prompt the input PIN code is incorrect.

Further, the receiving sub-module is further configured to receive a PIN verification signature data acquisition instruction;

the signature module further includes:

a fourth verifying sub-module, configured to verify the PIN verification signature data acquisition instruction when the PIN verification signature data acquisition instruction is received by the receiving sub-module, if the verification is successful, trigger a fourth generating sub-module; and if the verification is failed;

the fourth generating sub-module is configured to generate the PIN verification signature data;

the sending sub-module is further configured to send the PIN verification signature data generated by the fourth verifying sub-module to the terminal.

Further, the fourth verifying sub-module specifically includes:

a hash calculating unit, configured to calculate a terminal public key in the PIN verification signature data acquisition instruction and the stored signature module private key to obtain a first calculation value, and perform hash operation on the first calculation value to obtain a first hash value and take the first hash value as the second shared key;

a decrypting and intercepting unit, configured to decrypt a first calculation result in the PIN verification signature data acquisition instruction by using the second shared key to obtain a second result data, acquire a PIN code stored internally, and convert the PIN code into byte stream data, perform hash operation on the byte stream data and intercept data in the first 16 bytes of a hash result to obtain the intercepted data;

a seventh determining unit, configured to determine whether the second result data is consistent with the intercepted data, if yes, the verification is successful, trigger a fourth generating sub-module; otherwise, the verification is failed, and regenerate the signature module key pair and replace the stored signature module key pair.

Further, the fourth generating sub-module is specifically configured to generate a first random number as the PIN verification signature data, and encrypt the PIN verification signature data by using the second shared key to obtain ciphertext data;

the sending sub-module is further configured to send the PIN verification signature data generated by the fourth verifying sub-module to the terminal, specifically is: the sending sub-module is further configured to return the ciphertext data generated by the fourth verifying sub-module to the terminal.

Further, the fourth verifying sub-module further includes:

a third parsing and determining unit, configured to parse the received PIN verification signature data acquisition instruction, and determine whether the received PIN verification signature data acquisition instruction is parsed successfully, if yes, trigger the hash calculating unit; otherwise, report an error.

Further, the hash intercepting sub-unit is further configured to set the number of PIN code retries as the initial value;

the seventh determining unit is further configured to modify the number of PIN code retries to the initial value when the determination result of the seventh determining unit is positive;

the fourth verifying sub-module further includes:

an eighth determining unit, configured to determine whether the number of PIN code retries is the predetermined data, if yes, prompt PIN code is locked; otherwise, trigger the hash calculating unit;

a second updating and determining unit, configured to update the number of PIN code retries when the determination result of the seventh determining unit is negative; and determine whether the number of PIN code retries is the predetermined data, if yes, prompt PIN code is locked; otherwise, trigger a ninth determining unit; the ninth determining unit is configured to determine whether the verification of the PIN code is failed for three consecutive times, if yes, prompt the verified message of the PIN code is incorrect; otherwise, prompt the input PIN code is incorrect.

Further, the receiving sub-module is further configured to receive a shared key negotiation instruction sent by the terminal;

the signature module further includes:

a fifth generating sub-module, configured to generate the signature module key pair and store the signature module key pair when shared key negotiation instruction is received by the receiving sub-module;

the sending sub-module is further configured to return the signature module public key in the signature module key pair to the terminal.

Further, the signature module is a hardware device, a computer program or a combination of the hardware device and the computer program.

The present application provides another apparatus for realizing secure signature, the apparatus includes a processor and a memory; the memory is configured to store operation instructions; the processor is configured to execute the method for realizing secure signature cited above by calling the operation instructions.

Compared with the prior art, the present application has following advantages:

in the technical solution of the present application, the PIN verification operation is associated with the signature operation through the PIN verification signature data to ensure the signature security; and the signature module key pair is updated after the PIN verification operation fails to make the second shared key of the next PIN verification operation is different from that of the current PIN verification operation, which further improves the signature security.

BRIEF DESCRIPTION OF DRAWINGS

In order to more clearly describe the technical solutions in the embodiments of the present application, the following will briefly introduce the drawings that need to be used in the description of the embodiments. Obviously, the drawings in the following description are some embodiments of the present application. For those skilled in the art, without creative labor, other drawings can be obtained based on these drawings.

FIG. 2A-2C are flow charts of a method for setting a PIN code according to Embodiment 2 of the present application.

FIG. 6A-6C are flow charts of a method for realizing secure signature according to Embodiment 6 of the present application.

DETAILED DESCRIPTION OF THE EMBODIMENTS

The technical solutions in the embodiments of the present application will be clearly and completely described below in conjunction with the drawings in the embodiments of the present application. Obviously, the described embodiments are only a part of the embodiments of the present application, rather than all the embodiments. Based on the embodiments in this application, all other embodiments obtained by those skilled in the art without creative work shall fall within the protection scope of the present application.

The signature module in the embodiments can be a hardware device, a computer program or a combination of the hardware device and the computer program, and any software and hardware which can realize the technical solution are included in the scope.

Embodiment 1

Figure 1:
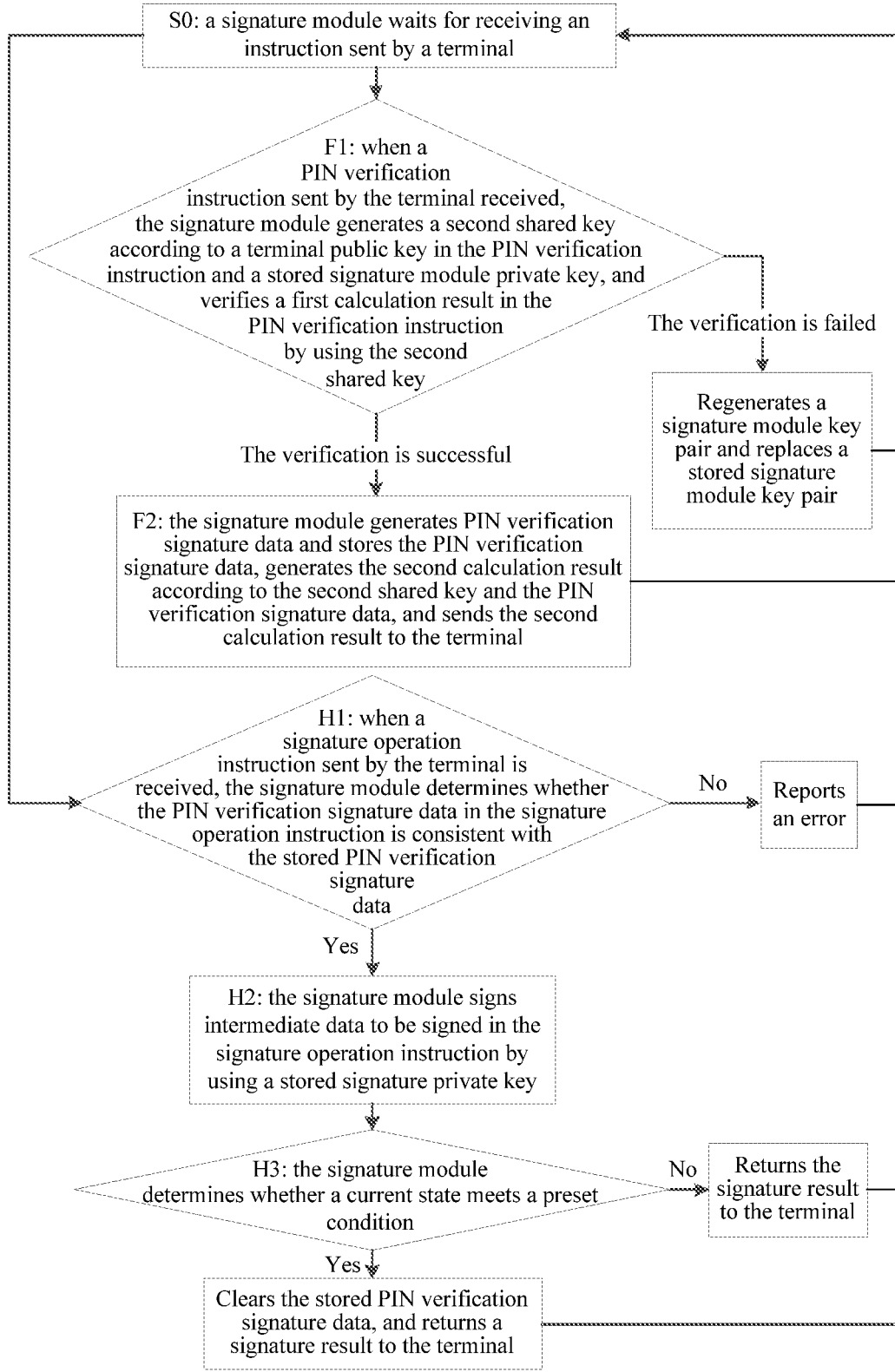
FIG. 1 is a flow chart of a method for realizing secure signature according to Embodiment 1 of the present application.

As shown in FIG. 1, embodiment 1 of the present application provides a method for realizing a secure signature, including:

step S0, a signature module waits for receiving an instruction sent by a terminal;

step F1, when a PIN verification instruction sent by the terminal received, the signature module generates a second shared key according to a terminal public key in the PIN verification instruction and a stored signature module private key, and verifies a first calculation result in the PIN verification instruction by using the second shared key, if the verifying is successfully, executes step F2; and if verifying is failed, regenerates a signature module key pair and replaces a stored signature module key pair, and returns to step S0; the signature module key pair includes a signature module private key and a signature module public key;

optionally, in this embodiment, before the verifying the first calculation result in the PIN verification instruction according to the second shared key, the method further includes: the signature module parses the received PIN verification instruction, and determines whether the parsing is successfully, if yes, continues the procedure; otherwise, reports an error.

Specifically, in this embodiment, the verifying the first calculation result in the PIN verification instruction by using the second shared key includes:

the signature module performs decryption operation on the first calculation result in the PIN verification instruction by using the generated second shared key to obtain a second result data, obtains a PIN code stored internally and converts the PIN code stored internally to second byte stream data, performs hash operation on the second byte stream data and intercepts data in the first 16 bytes of a hash result as intercepted data, and determines whether the intercepted data is consistent with the second result data, if yes, the verifying is successful; otherwise, the verifying is failed.

Specifically, in this embodiment, the generating the second shared key according to the terminal public key in the PIN verification instruction and the stored signature module private key includes: the signature module calculates the terminal public key in the PIN verification instruction and the stored signature module private to obtain a first calculation value, and performs hash operation on the first calculation value to obtain a first hash value and takes the first hash value as the second shared key.

Specifically, in this embodiment, the generating the second calculation result according to the second shared key and the PIN verification signature data, and sending the second calculation result to the terminal includes: encrypting the PIN verification signature data by using the second shared key to obtain ciphertext data, and sending the ciphertext data to the terminal.

Step F2, the signature module generates PIN verification signature data and stores the PIN verification signature data, generates the second calculation result according to the second shared key and the PIN verification signature data, and sends the second calculation result to the terminal, and returns to step S0.

step H1, when a signature operation instruction sent by the terminal is received, the signature module determines whether the PIN verification signature data in the signature operation instruction is consistent with the stored PIN verification signature data, if yes, executes step H2; otherwise, reports an error, and returns to step S0.

In this embodiment, before the determining whether the PIN verification signature data in the signature operation instruction is consistent with the stored PIN verification signature data in step H1, the method further includes: the signature module parses the received signature operation instruction, and determines whether the received signature operation instruction is parsed successfully, if yes, continues to execute; otherwise, reports an error;

step H2, the signature module signs intermediate data to be signed in the signature operation instruction by using a stored signature private key;

step H3, the signature module determines whether a current state meets a preset condition, if yes, clears the stored PIN verification signature data, and returns a signature result to the terminal, and returns to step S0; otherwise, returns the signature result to the terminal, and returns to step S0.

Optionally, in this embodiment, before the verifying the first calculation result in the PIN verification instruction according to the generated second shared key, the method further includes: the signature module determines whether the number of the PIN code retries is the predetermined data, if yes, reports an error, and prompts the PIN code is locked; otherwise, continues the procedure;

the following steps are also included when the verification in step F1 fails:

step C1, the signature module updates the number of the PIN code retries;

step C2, the signature module determines whether the number of the PIN code retries is the predetermined data, if yes, prompts the PIN code is locked; otherwise, executes step C3;

step C3, the signature module determines whether the verification of the PIN code is failed for three consecutive times, if yes, prompts the verified message of the PIN code is incorrect; otherwise, prompts the input PIN code is incorrect; step F2 further includes: modifying the number of the PIN code retries as an initial value.

In this embodiment, the signature operation can be a general signature or a re-checked signature, in the case that the signature operation is the re-checked signature, step H1 and H2 are replaced with:

step P1, when a secure environment setting operation instruction sent by the terminal is received, the signature module determines whether the PIN verification signature data in the secure environment setting operation instruction is consistent with the stored PIN verification signature data, if yes, executes step P2; otherwise, ends the procedure;

step P2, the signature module determines whether signature setting algorithm is legitimate according to an algorithm ID and a key container ID in the secure environment setting instruction, if yes, executes step P3; otherwise, ends the procedure.

Specifically, in this embodiment, step P2 includes:

step P21, the signature module determines whether a corresponding container exists according to the key container ID, if yes, executes step P22; otherwise, ends the procedure;

step P22, the signature module determines whether a corresponding algorithm is supported according to the algorithm ID, if yes, executes step P3; otherwise, ends the procedure;

step P3, the signature module opens a corresponding key container according to the key container ID, and sets a corresponding algorithm according to the algorithm ID, and returns a secure environment setting succeed response to the terminal.

In this embodiment, step T3 further includes the signature module returns a hash value to the terminal.

Step T1, when a hash operation instruction sent by the terminal is received, the signature module determines whether the PIN verification signature data in the hash operation instruction is consistent with the stored PIN verification signature data, if yes, executes step T2; otherwise, ends the procedure;

step T2, the signature module parses the hash operation instruction to obtain data to be signed and store the data to be signed;

step T3, the signature module performs hash operation on the data to be signed according to a set algorithm to obtain a hash value and stores the hash value, and returns a hash operation successful response to the terminal;

step Q1, when the signature operation instruction sent by the terminal is received, the signature module determines whether the PIN verification signature data in the signature operation instruction is consistent with the stored PIN verification signature data, if yes, executes step Q2; otherwise, ends the procedure; step Q2, the signature module intercepts key information from the stored data to be signed and determines whether the intercepting is successful, if yes, executes step Q3; otherwise, ends the procedure;

step Q3, the signature module displays the key information and determines whether user confirm information is received, if yes, the signature module signs the stored hash value by using the signature private key in the container corresponding to the container ID in the signature operation instruction to obtain a signature result and stores the signature result; otherwise, ends;

step Q4, the signature module determines whether a current state meets a preset condition, if yes, clears the stored PIN verification signature data, and returns signature success information to the terminal; otherwise, returns signature failure information to the terminal;

step L1, when receiving a signature result obtaining instruction sent by the terminal, the signature module returns the signature result to the terminal.

In this embodiment, step F2 further includes setting a PIN verification signature identification as valid;

step H1, step P1, step T1, and step Q1 further includes the signature module determines whether the PIN verification signature identification is valid, if yes, continues the procedure; otherwise, reports an error;

when it is determined as yes in step H3, the method further includes setting the PIN verification signature identification as invalid.

Preferably, the setting the PIN verification signature identification as valid specifically is setting the PIN verification signature identification; the determining whether the PIN verification signature identification is valid specifically is determining whether the PIN verification signature identification is set; the setting the PIN verification signature identification as invalid specifically is: resetting the PIN verification signature identification.

The method in this embodiment applies to once signature after once PIN verification, multiple signature after once PIN verification or signature within a signature valid duration after once PIN verification.

Optionally, in this embodiment, step F2 further includes: setting the number of times of signature as an initial value; the signature module determines whether the current state meets the preset condition includes: updating the number of times of signature, and determining whether the number of times of signature equals to the preset value, if yes, the current state meets the preset condition; otherwise, the current state does not meet the preset condition.

for example, for multiple signature after once PIN verification, the number of times of signature is set as an initial value 0 or N (N is a non-1 positive integer), the updating the number of times of signature is self-added 1 or self-subtracted 1, the preset value is N (N is a non-1 positive integer) or 0;

for example, for once signature after once PIN verification, the number of times of signature is set as initial value N (N is a non-1 positive integer) or N+1, the updating the number of times of signature is self-added 1 or self-subtracted 1, the preset value is N+1 (N is a non-1 positive integer), or N;

If it is the case that signature within a signature valid duration after once PIN verification, step F2 further includes: setting signature valid time; the signature module determines whether the current state meets the preset condition includes: determining whether the current time is within the signature valid time, if yes, reporting an error; otherwise, clearing the PIN verification signature data.

The method of this embodiment further includes when the PIN code setting instruction is received, the signature module determines whether the PIN code is set, if yes, reports an error; otherwise, verifies the PIN code setting instruction, if the verifying is successful, generates the PIN code and stores the PIN code according to the first ciphertext in the PIN code setting instruction; if the verifying is failed, ends the procedure.

Specifically, the signature module verifies the PIN code setting instruction includes:
step M1, the signature module calculates the stored signature module private key and the terminal public key in the PIN code setting instruction to obtain a first calculation value, and performs hash operation on the first calculation value, and takes a hash value as the second shared key.
Optionally, before step M1, the method further includes:
the signature module parses a receiving PIN code setting instruction, and determines whether the PIN code setting instruction is parsed successfully, if yes, executes step M1; otherwise, reports an error.
Step M2, the signature module performs HMAC operation on the first ciphertext in the PIN code setting instruction by using the second shared key to obtain a second operation result, intercepts data in the first 16 bytes of the second operation result to obtain intercepted data.
Step M3, the signature module determines whether the intercepted data is consistent with the first result data in the PIN code setting instruction, if yes, the verifying is successful; otherwise, the verifying is failed.

Specifically, in this embodiment, the generating the PIN code according to the first ciphertext in the PIN code setting instruction and storing the PIN code includes:
step N1, the signature module decrypts the first ciphertext in the PIN code setting instruction by using the second shared key to obtain a first decrypted value, removes padding data in the first decrypted value to obtain a password intermediate value;
step N2, the signature module determines whether the password intermediate value is less than a first preset value, if yes, reports an error; otherwise, executes step N3;
step N3, the signature module performs hash operation on the password intermediate value to obtain a hash result, intercepts data in the first 16 bytes of the hash result and stores the intercepted data as the PIN code.

Specifically, in this embodiment, the method further includes:
when the PIN code modifying instruction, the signature module verifies the PIN code modifying instruction, and replaces the stored PIN code with the PIN code in the PIN code modifying instruction if the verifying is successfully; reports an error if the verifying is failed.

Specifically, in this embodiment, the verifying the PIN code modifying instruction includes:
step W1, the signature module calculates the stored signature module private key and the terminal public key in the PIN code modifying instruction to obtain a first result data, and performs hash operation on the first result data to obtain a second shared key; and splices a first encrypted value in the PIN code modifying instruction with a second encrypted value in the PIN code modifying instruction to obtain a second spliced result;
Optionally, before step W1, the method further includes:
the signature module parses the received PIN code modifying instruction, and determines whether the PIN code modifying instruction is parsed successfully, if yes, executes step W1; otherwise, reports an error.
step W2, the signature module performs HMAC operation on the second spliced result by using the second shared key to obtain the second operation result, and intercepts data in the first 16 bytes from the second operation result to obtain the intercepted data;
step W3, the signature module determines whether the intermediate data in the PIN code modifying instruction is consistent with the intercepted data, if yes, executes step W4; otherwise, reports an error;
step W4, the signature module decrypts the first encrypted value by using the second shared key to obtain a first decrypted value;
step W5, the signature module determines whether the first decrypted value is consistent with the PIN code stored internally, if yes, the verification is successful; otherwise, the verification is failed, and the signature module key pair is regenerated and the stored signature module key pair is replaced.

Specifically, in this embodiment, the replacing the stored PIN code with the PIN code in the PIN code modifying instruction includes:
step K1, the signature module decrypts the second encrypted value by using the second shared key to obtain a second decrypted value, removes the padding data from the second decrypted value to obtain a first intermediate value;

step K2, the signature module determines whether the length of the first intermediate value is less than the first preset value, if yes, executes step K3; otherwise, reports an error;

step K3, the signature module performs hash operation on the first intermediate value to obtain a hash result, and intercepts data in the first 16 bytes of the hash result and replaces the PIN code stored internally.

In this embodiment, step N3 further includes the signature module sets the number of PIN code retries as an initial value;

step K3 further includes the signature module modifies the number of PIN code retries into the initial value;

before step W1, the method further includes: the signature module determines whether the number of PIN code retries is the predetermined data, if yes, prompts the PIN code is locked; otherwise, executes step W1;

after the verification in step W5 fails, the method further includes: step W6, the signature module updates the number of PIN code retries;

step W7, the signature module determines whether the number of PIN code retries is the predetermined data, if yes, prompts the PIN code is locked; otherwise, executes step W8;

step W8, the signature module determines whether the verification of the PIN code is failed for three consecutive times, if yes, prompts the verified message of the PIN code is incorrect; otherwise, prompts the input PIN code is incorrect.

Optionally, the method in this embodiment further includes:

when a PIN verification signature data acquisition instruction is received, the signature module verifies the PIN verification signature data acquisition instruction, and generates the PIN verification signature data and sends the PIN verification signature data to the terminal if the verifying is successfully; and ends the procedure if the verifying is failed.

Specifically, the verifying the PIN verification signature data acquisition instruction includes:

step R1, the signature module calculates the terminal public key in the PIN verification signature data acquisition instruction and the stored signature module private key to obtain a first calculation value, and performs hash operation on the first calculation value to obtain a first hash value and takes the first hash value as the second shared key;

optionally, before step R1, the method further includes step R0, the signature module parses the received PIN verification signature data acquisition instruction, and determines whether the PIN verification signature data acquisition instruction is parsed successfully, if yes, executes step R1; otherwise, reports an error.

step R2, the signature module performs decryption operation on a first calculation result in the PIN verification signature data acquisition instruction by using the second shared key to obtain second result data, obtains a PIN code stored internally, and converts the PIN code stored internally to byte stream data, performs hash operation on the byte stream data and intercepts data in the first 16 bytes of a hash result to obtain intercepted data;

step R3, the signature module determines whether the second result data is consistent with the intercepted data, if yes, the verifying is successful; otherwise, the verifying is failed, and regenerates a signature module key pair and replaces the stored signature module key pair.

Specifically, the generating the PIN verification signature data and sending the PIN verification signature data to the terminal includes generating a first random number as the PIN verification signature data, encrypting the PIN verification signature data by using the second shared key to obtain ciphertext data, and returning the ciphertext data to the terminal.

Optionally, in this embodiment, step N3 further includes that the signature module sets the number of PIN code retries as the initial value;

when the verification in step R3 is successful, the method further includes the signature module modifies the number of PIN code retries to the initial value;

before step R1, the method further includes the signature module determines whether the number of PIN code retries is the predetermined data, if yes, prompts the PIN code is locked; otherwise, executes step R1;

when the determination result in step R3 is negative, the method further includes:

step R4, the signature module updates the number of PIN code retries;

step R5, the signature module determines whether the number of PIN code retries is the predetermined data, if yes, prompts the PIN code is locked; otherwise, executes step R6;

step R6, the signature module determines whether the verification of the PIN code is failed for three consecutive times, if yes, prompts the verified message of the PIN code is incorrect; otherwise, prompts the input PIN code is incorrect.

The method in this embodiment further includes:

when a shared key negotiation instruction is received, the signature module generates the signature module key pair and stores the signature module key pair, and returns the signature module public key in the signature module key pair to the terminal.

Embodiment 2

Figure 2A:
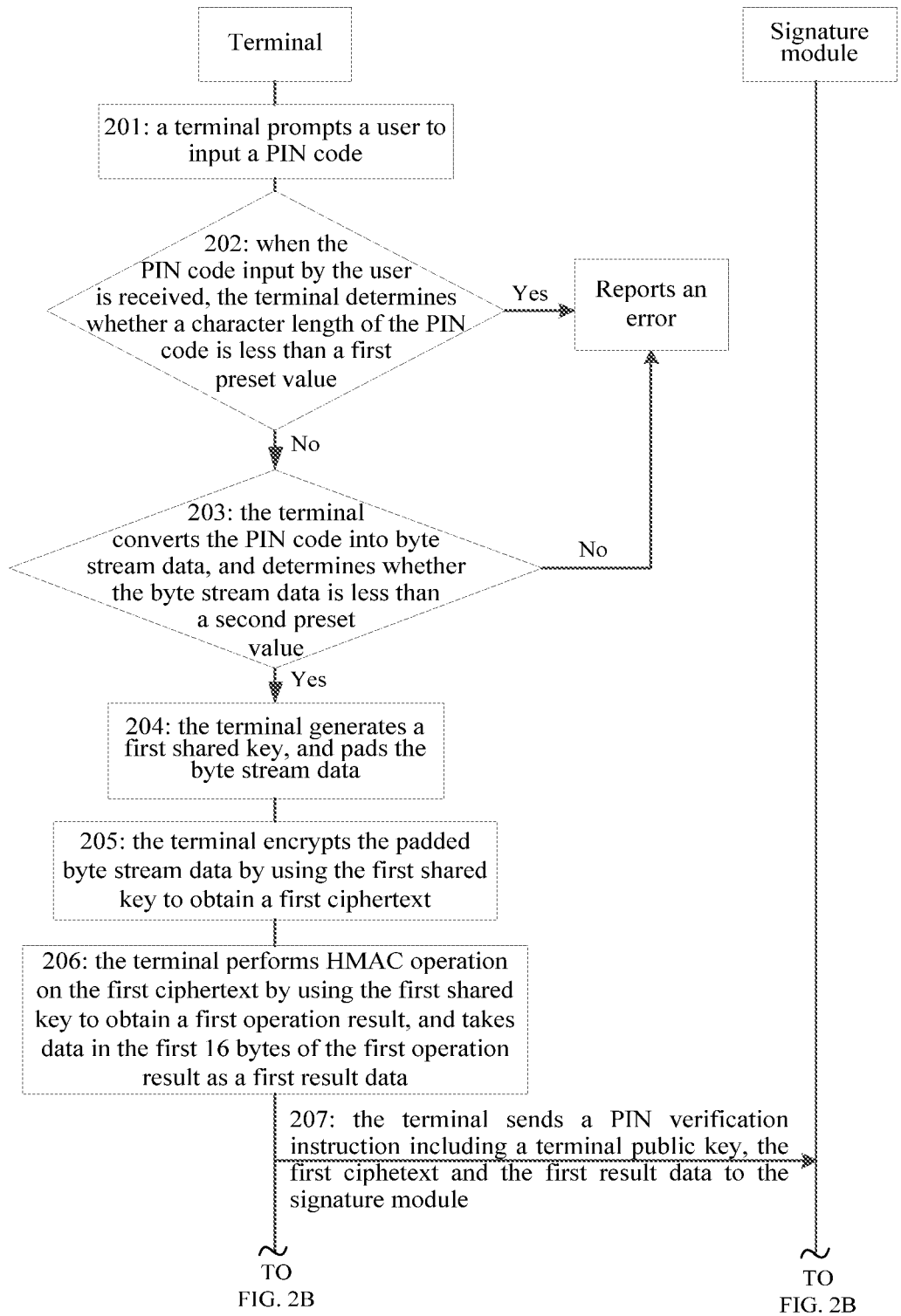
Figure 2B:
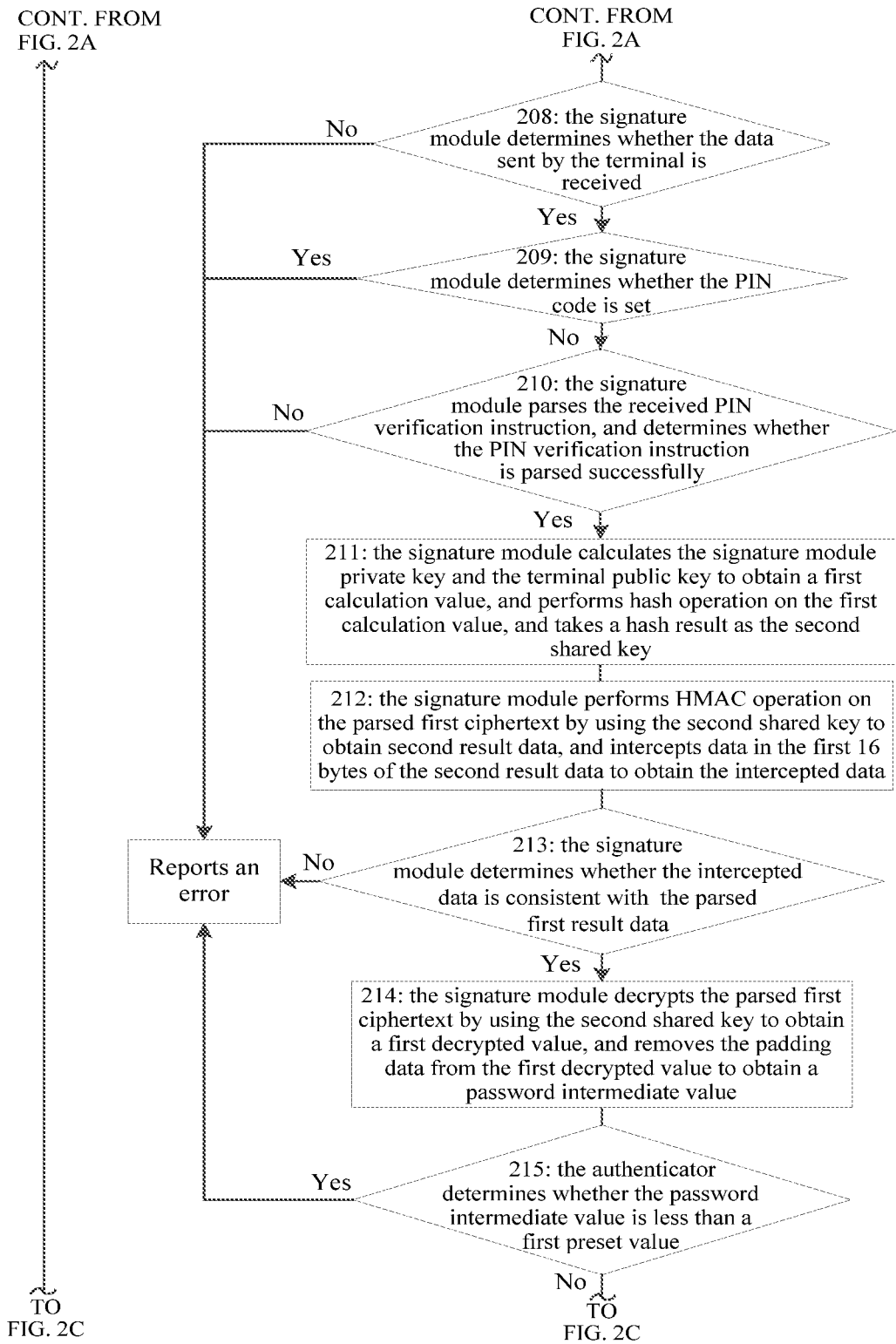

As shown in FIG. 2A-2C, Embodiment 2 of the present application provides a method for setting a PIN code, including:

step 201, a terminal prompts a user to input a PIN code;

step 202, when the PIN code input by the user is received, the terminal determines whether a character length of the PIN code is less than a first preset value, if yes, reports an error; otherwise, executes step 203;

for example, in this embodiment, the first preset value is 4;

step 203, the terminal converts the PIN code into byte stream data, and determines whether the byte stream data is less than a second preset value, if yes, executes step 204; otherwise, reports an error;

for example, in this embodiment, the second preset value is 255;

step 204, the terminal generates a first shared key, and pads the byte stream data;

specifically, in this embodiment, the terminal generates the first shared key in step 204 includes:

step A1, the terminal sends a shared key negotiation instruction to the signature module;

step A2, when the shared key negotiation instruction is received, the signature module generates a signature module key pair and stores the signature module key pair, and returns a signature module public key in the signature module key pair to the terminal;

step A3, the terminal receives the signature module public key returned by the signature module, generates a terminal key pair, calculates a private key in the terminal key pair and the signature module public key to obtain a first data, performs hash operation on the first data to obtain a hash value and takes the hash value as a first shared key;

specifically, in this embodiment, the padding the byte stream data includes that the terminal determines a length of the byte stream data is the multiple of 64, if yes, executes step 205; otherwise, pads the byte stream data with 0x00 until the length of the byte stream data is the multiple of 64, and executes step 205;

step 205, the terminal encrypts the padded byte stream data by using the first shared key to obtain a first ciphertext;

step 206, the terminal performs HMAC operation on the first ciphertext by using the first shared key to obtain a first operation result, and takes data in the first 16 bytes of the first operation result as a first result data;

step 207, the terminal sends a PIN verification instruction including a terminal public key, the first ciphertext and the first result data to the signature module;

step 208, the signature module determines whether the data sent by the terminal is received, if yes, executes step 209; otherwise, reports an error;

step 209, the signature module determines whether the PIN code is set, if yes, reports an error; otherwise, executes step 210;

step 210, the signature module parses the received PIN verification instruction, and determines whether the PIN verification instruction is parsed successfully, if yes, executes step 211; otherwise, reports an error; step 211, the signature module calculates the signature module private key and the terminal public key to obtain a first calculation value, and performs hash operation on the first calculation value, and takes a hash result as the second shared key;

step 212, the signature module performs HMAC operation on the parsed first ciphertext by using the second shared key to obtain a second result data, and intercepts data in the first 16 bytes of the second result data to obtain intercepted data;

step 213, the signature module determines whether the intercepted data is consistent with the parsed first result data, if yes, executes step 214; otherwise, reports an error;

step 214, the signature module decrypts the parsed first ciphertext by using the second shared key to obtain a first decrypted value, and removes the padding data from the first decrypted value to obtain a password intermediate value;

step 215, the signature module determines whether the password intermediate value is less than a first preset value, if yes, reports an error; otherwise, executes step 216;

step 216, the signature module performs hash operation on the password intermediate value to obtain the hash result, intercepts data in the first 16 bytes of the hash result and stores the intercepted data as a PIN code, and sets the number of PIN code retries as an initial value;

for example, the predetermined data in this embodiment is 8.

Embodiment 3

Figure 3A:
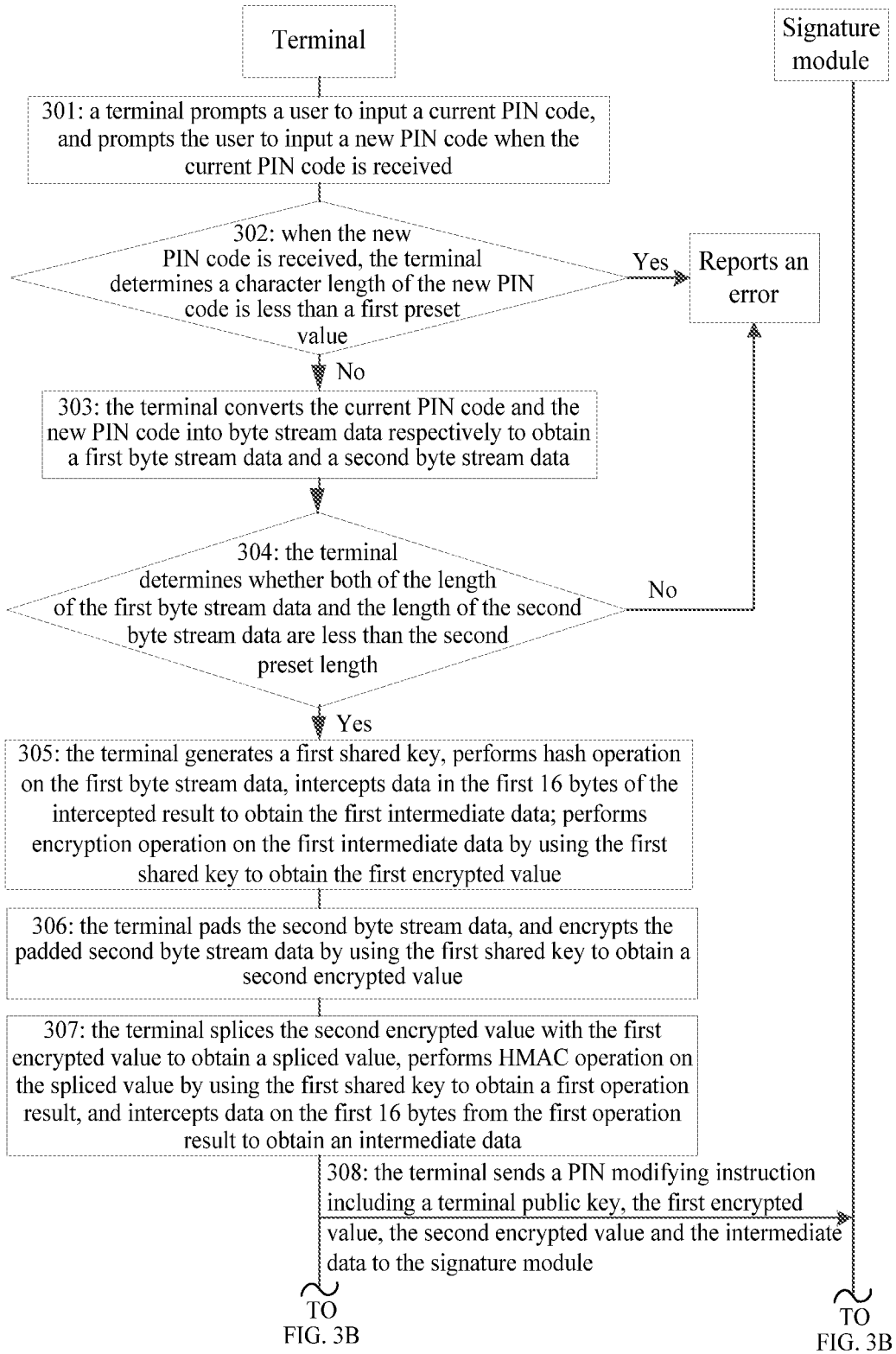
FIG. 3A-3C are flow charts of a method for modifying a PIN code according to Embodiment 3 of the present application.
Figure 3B:
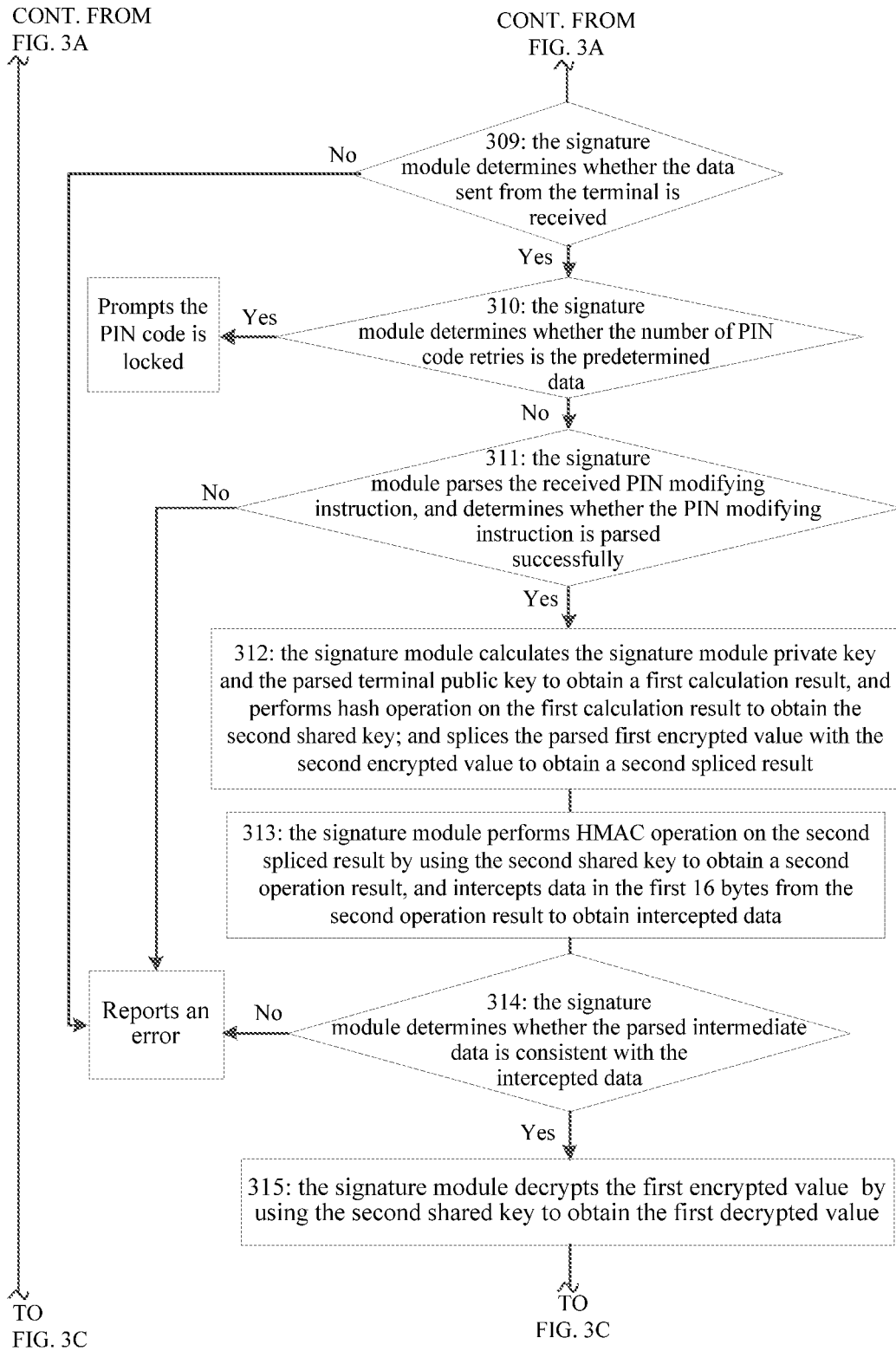
Figure 3C:
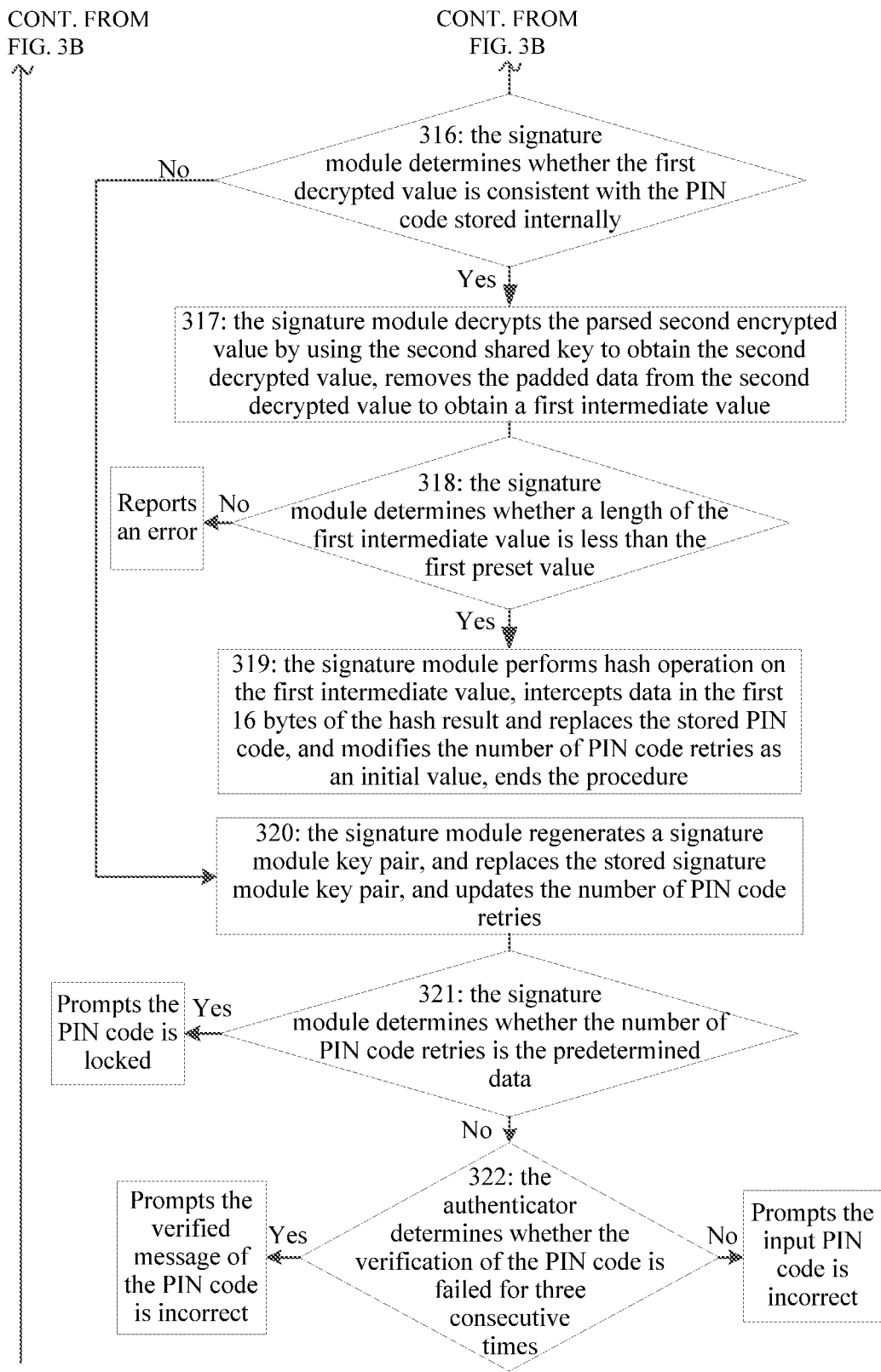

As shown in FIG. 3A-3C, Embodiment 3 of the present application provides a method for modifying a PIN code, including:

step 301, a terminal prompts a user to input a current PIN code, and prompts the user to input a new PIN code when the current PIN code is received;

step 302, when the new PIN code is received, the terminal determines a character length of the new PIN code is less than a first preset value, if yes, reports an error; otherwise, executes step 303;

for example, in this embodiment, the first preset value is 4;

step 303, the terminal converts the current PIN code and the new PIN code into byte stream data respectively to obtain a first byte stream data and a second byte stream data;

step 304, the terminal determines whether both of the length of the first byte stream data and a length of the second byte stream data are less than the second preset length, if yes, executes step 305; otherwise, reports an error;

for example, in this embodiment 3, the second preset value is 255;

step 305, the terminal generates a first shared key, performs hash operation on the first byte stream data, intercepts data in the first 16 bytes of the intercepted result to obtain the first intermediate data; performs encryption operation on the first intermediate data by using the first shared key to obtain a first encrypted value;

specifically, in this embodiment, the realizing process of step 305 is with the same as that of step 204, which will not be repeated herein;

step 306, the terminal pads the second byte stream data, and encrypts the padded second byte stream data by using the first shared key to obtain a second encrypted value;

specifically, in this embodiment, the terminal determines whether a length of the second byte stream data is a multiple of 64, if not, pads the second byte stream data by using 0x00 until the length of the second byte stream data is the multiple of 64; step 307, the terminal splices the second encrypted value with the first encrypted value to obtain a spliced value, performs HMAC operation on the spliced value by using the first shared key to obtain a first operation result, and intercepts data on the first 16 byte from the first operation result to obtain an intermediate data;

step 308, the terminal sends a PIN modifying instruction including a terminal public key, the first encrypted value, the second encrypted value and the intermediate data to the signature module;

step 309, the signature module determines whether the data sent by the terminal is received, if yes, executes step 310; otherwise, reports an error;

step 310, the signature module determines whether the number of PIN code retries is the predetermined data, if yes, prompts the PIN code is locked; otherwise, executes step 311;

step 311, the signature module parses the received PIN modifying instruction, and determines whether the PIN modifying instruction is parsed successfully, if yes, executes step 312; otherwise, reports an error;

step 312, the signature module calculates the signature module private key and the parsed terminal public key to obtain a first calculation result, and performs hash operation on the first calculation result to obtain the second shared key; and splices the parsed first encrypted value with the second encrypted value to obtain a second spliced result;

step 313, the signature module performs HMAC operation on the second spliced result by using the second shared key to obtain a second operation result, and intercepts data in the first 16 bytes from the second operation result to obtain intercepted data;

step 314, the signature module determines whether the parsed intermediate data is consistent with the intercepted data, if yes, executes step 315; otherwise, reports an error;

step 315, the signature module decrypts the first encrypted value by using the second shared key to obtain the first decrypted value;

step 316, the signature module determines whether the first decrypted value is consistent with the PIN code stored internally, if yes, executes step 317; otherwise, executes step 320;

step 317, the signature module decrypts the parsed second encrypted value by using the second shared key to obtain the second decrypted value, removes the padded data from the second decrypted value to obtain a first intermediate value;

step 318, the signature module determines whether a length of the first intermediate value is less than the first preset value, if yes, executes step 319; otherwise, reports an error;

step 319, the signature module performs hash operation on the first intermediate value, intercepts data in the first 16 bytes of the hash result and replaces the stored PIN code, and modifies the number of PIN code retries as an initial value;

step 320, the signature module regenerates a signature module key pair, and replaces the stored signature module key pair, and updates the number of PIN code retries;

in embodiment, if the initial value of the number of PIN code retries is 0, the updating the number of PIN code retries specifically is: self-adding 1 to the number of PIN code retries; if the initial value of the number of PIN code retries is a positive integer, the updating the number of PIN code retries specifically is: self-subtracting 1 from the number of PIN code retries;

step 321, the signature module determines whether the number of PIN code retries is the predetermined data, if yes, prompts the PIN code is locked; otherwise, executes step 322;

in this embodiment, if the initial value of the number of PIN code retries is 0, the predetermined data is a positive integer; if the number of PIN code retries is the positive integer, the predetermined data is 0;

step 322, the signature module determines whether the verification of the PIN code is failed for three consecutive times, if yes, prompts the verified message of the PIN code is incorrect; otherwise, prompts the input PIN code is incorrect.

Embodiment 4

Figure 4A:
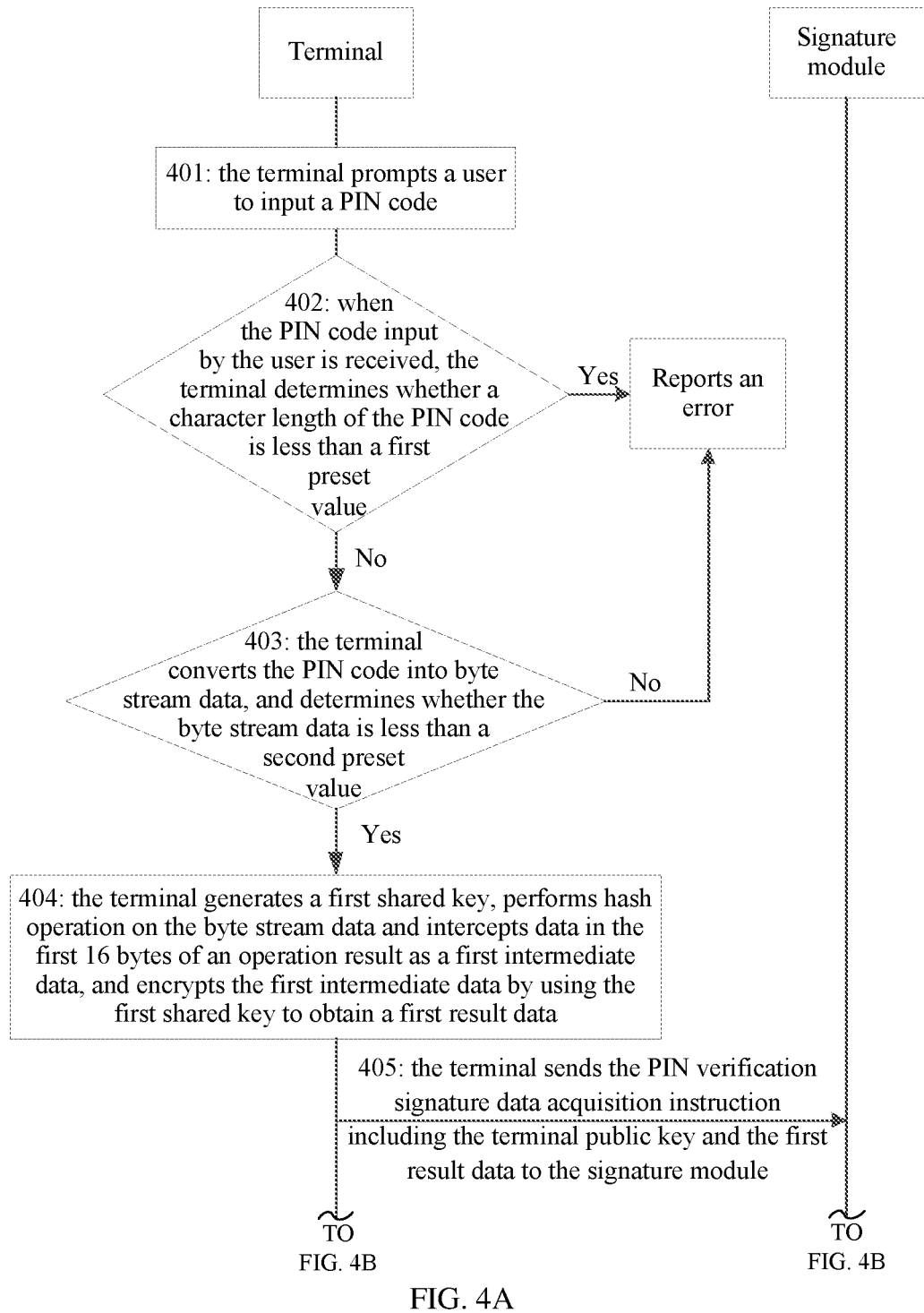
FIG. 4A-4C are flow charts of a method for acquiring PIN verification signature data according to Embodiment 4 of the present application.
Figure 4B:
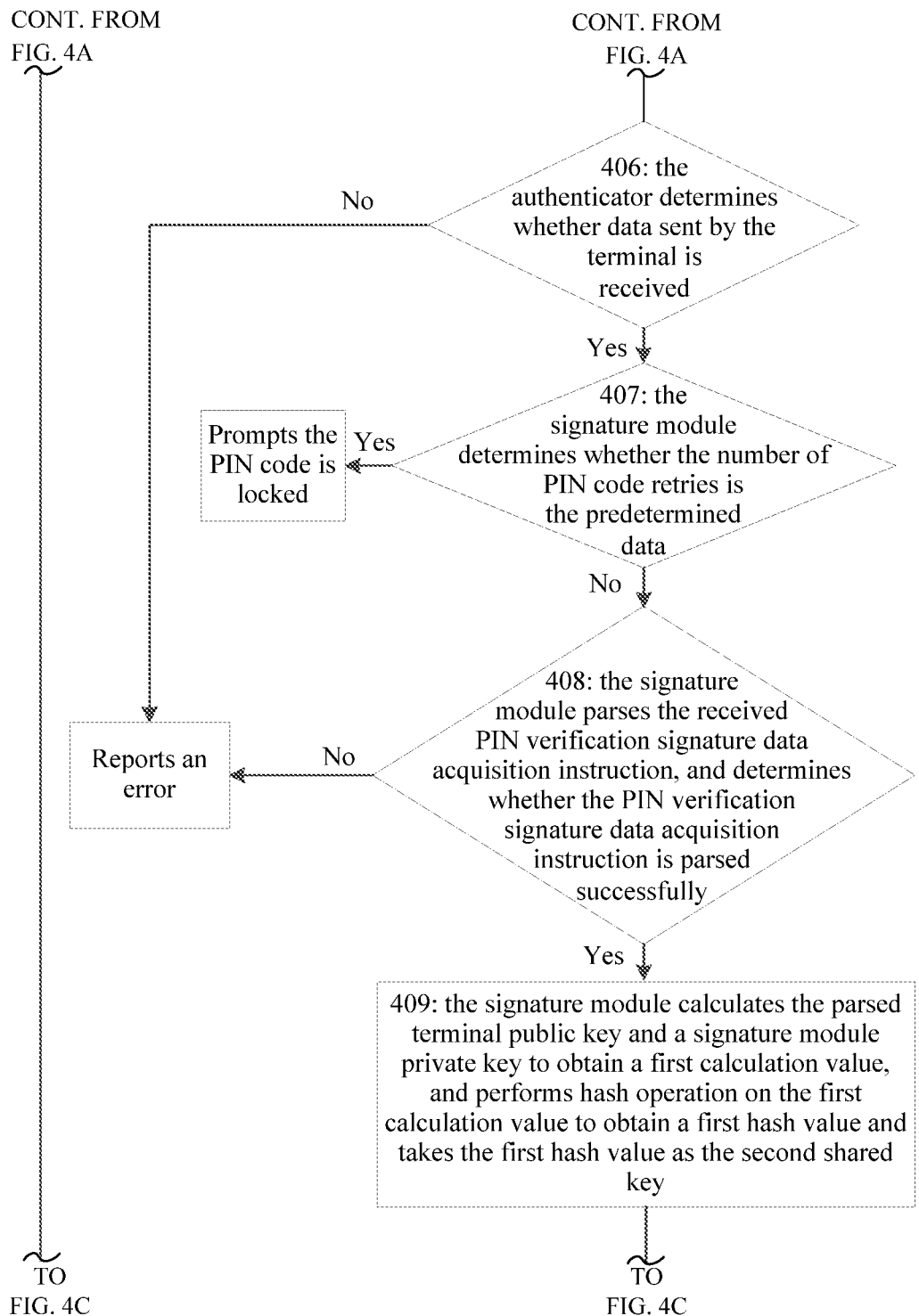
Figure 4C:
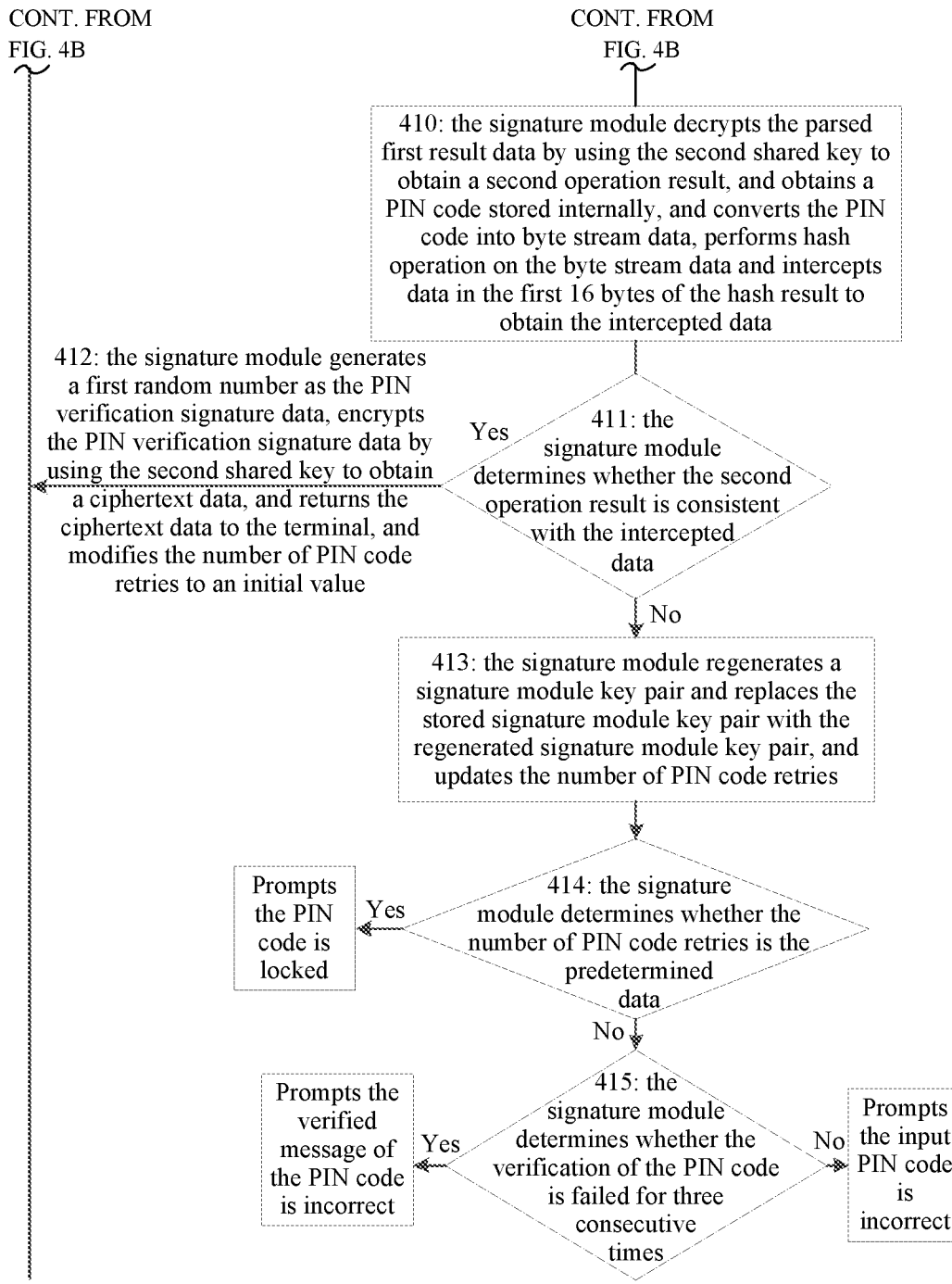
Figure 5A:
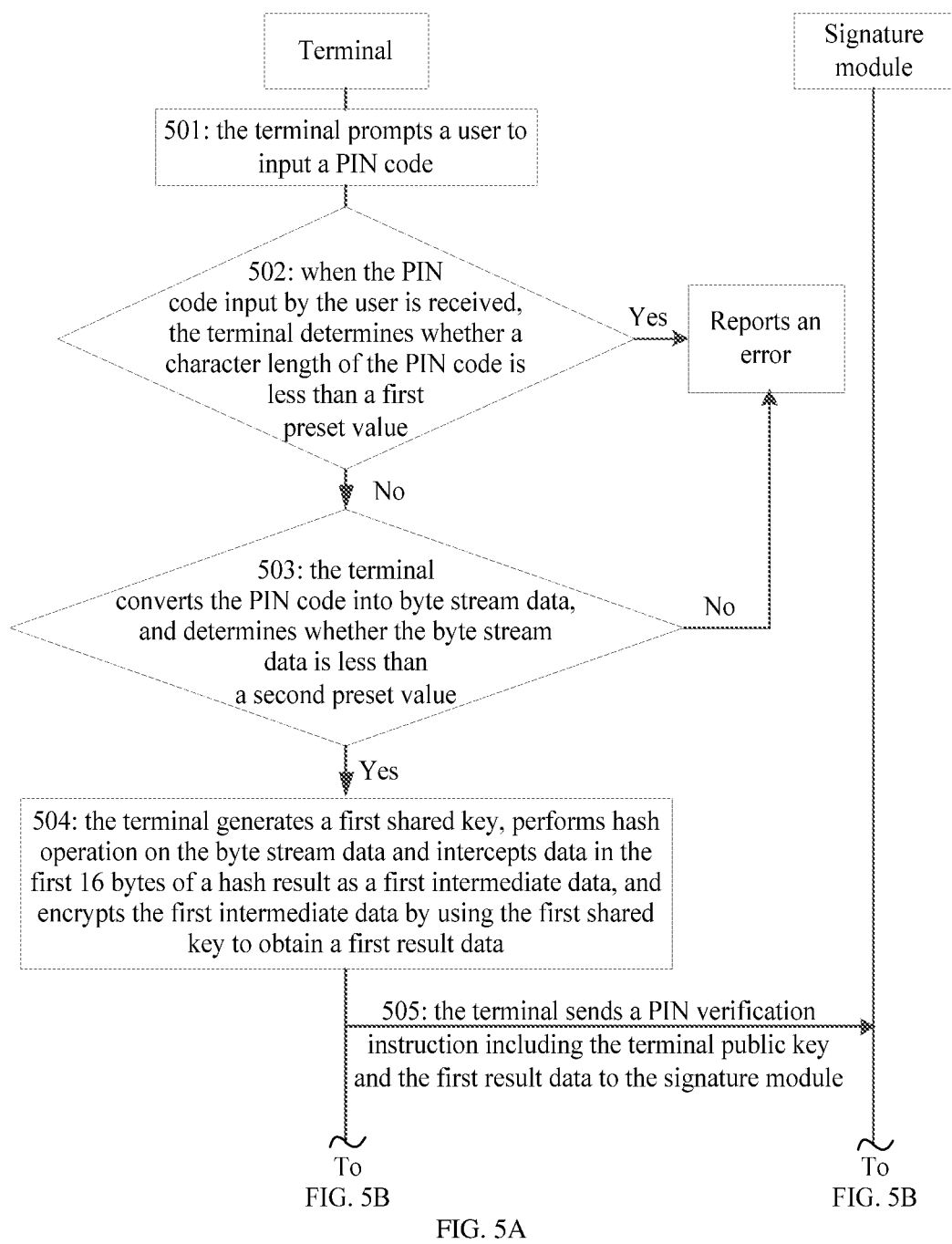
FIG. 5A-5D are flow charts of a method for realizing secure signature according to Embodiment 5 of the present application.
Figure 5B:
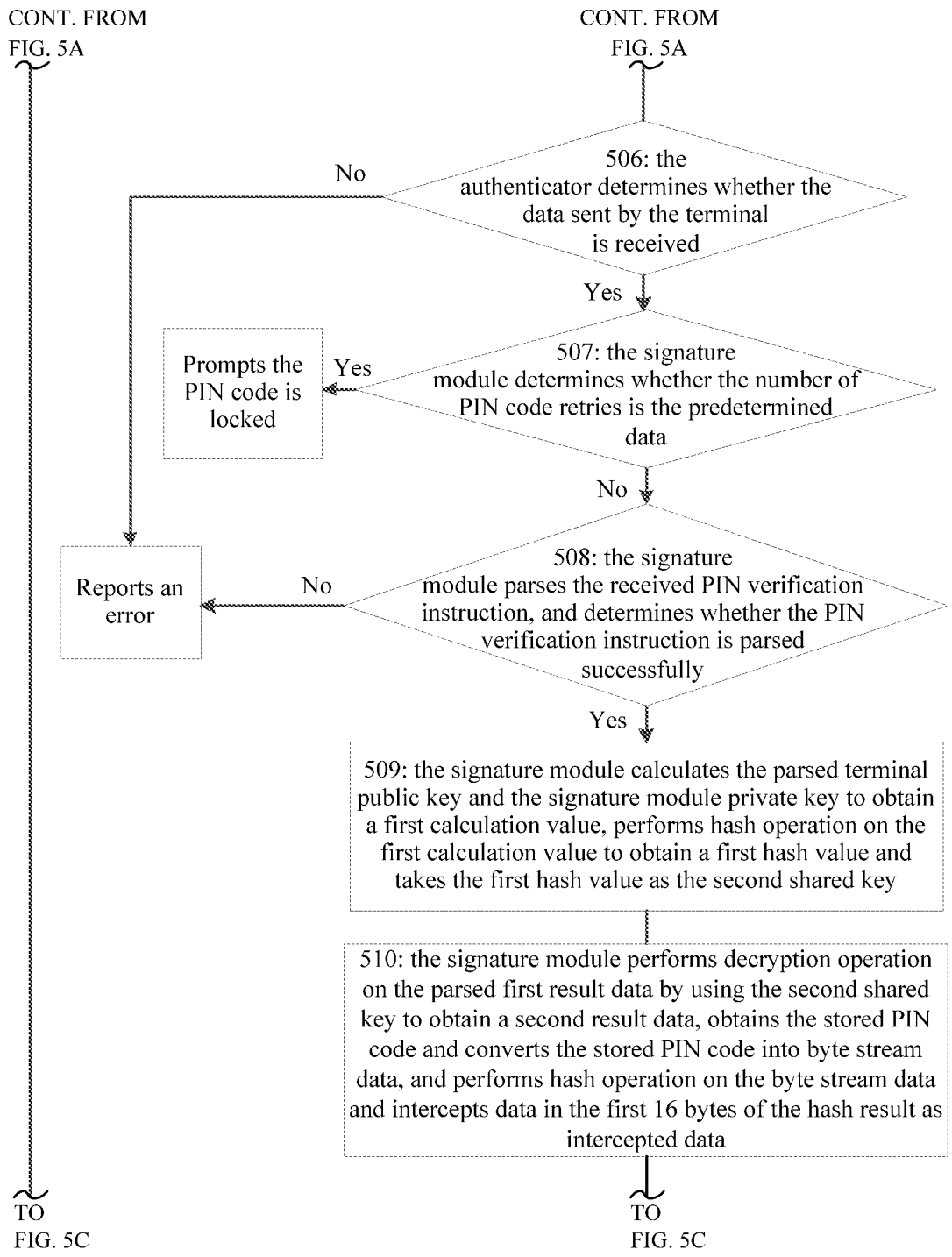
Figure 5C:
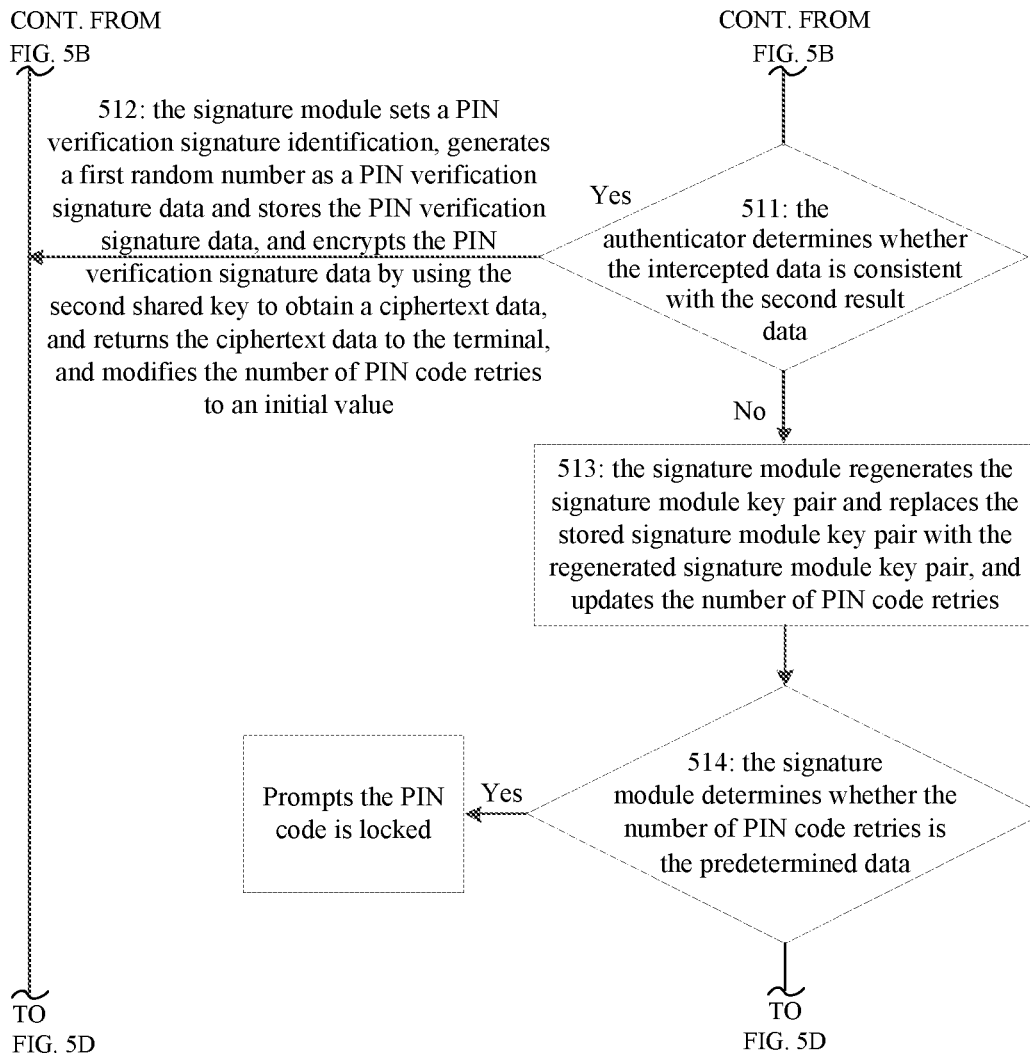
Figure 5D:
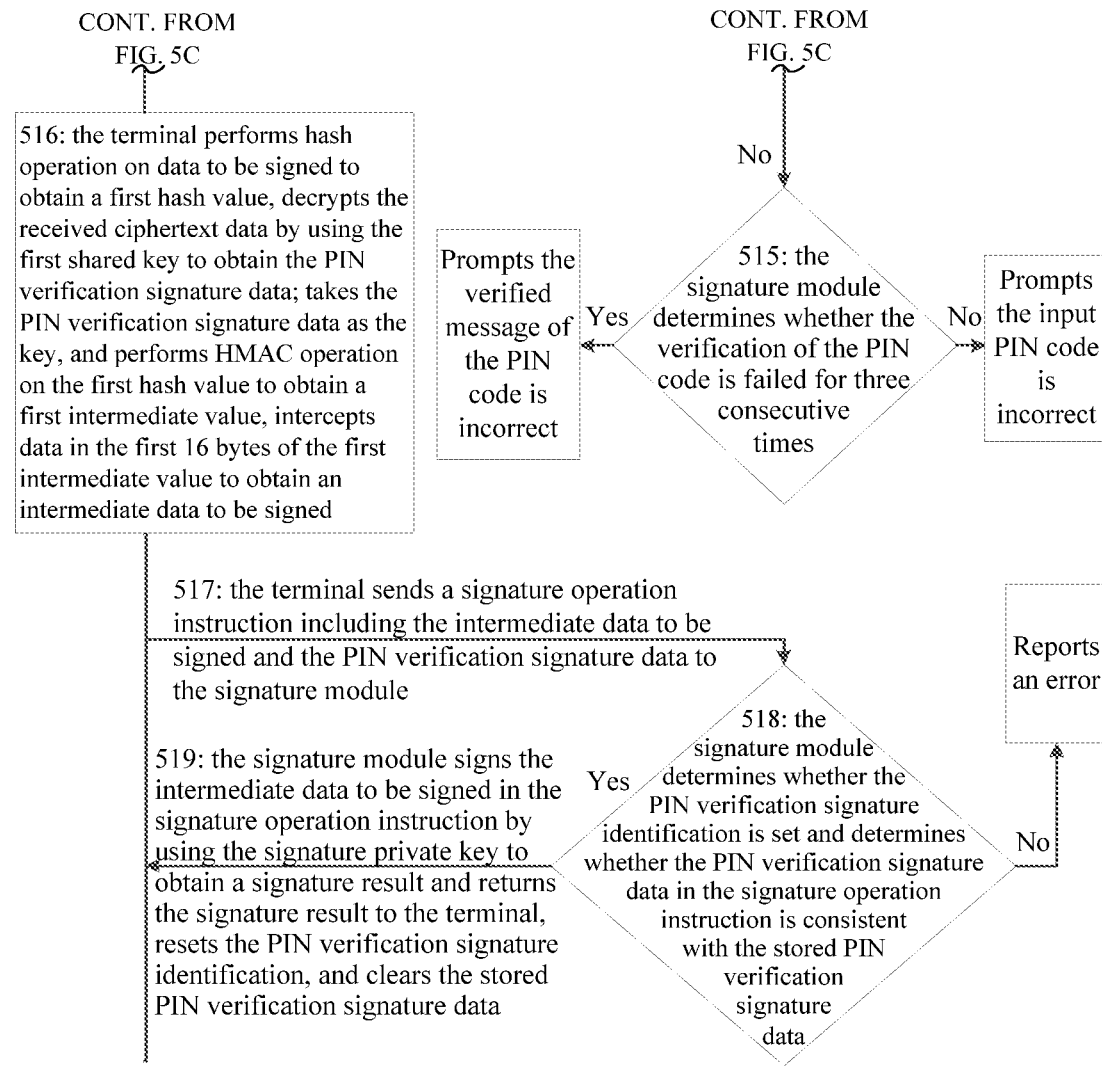
Figure 6A:
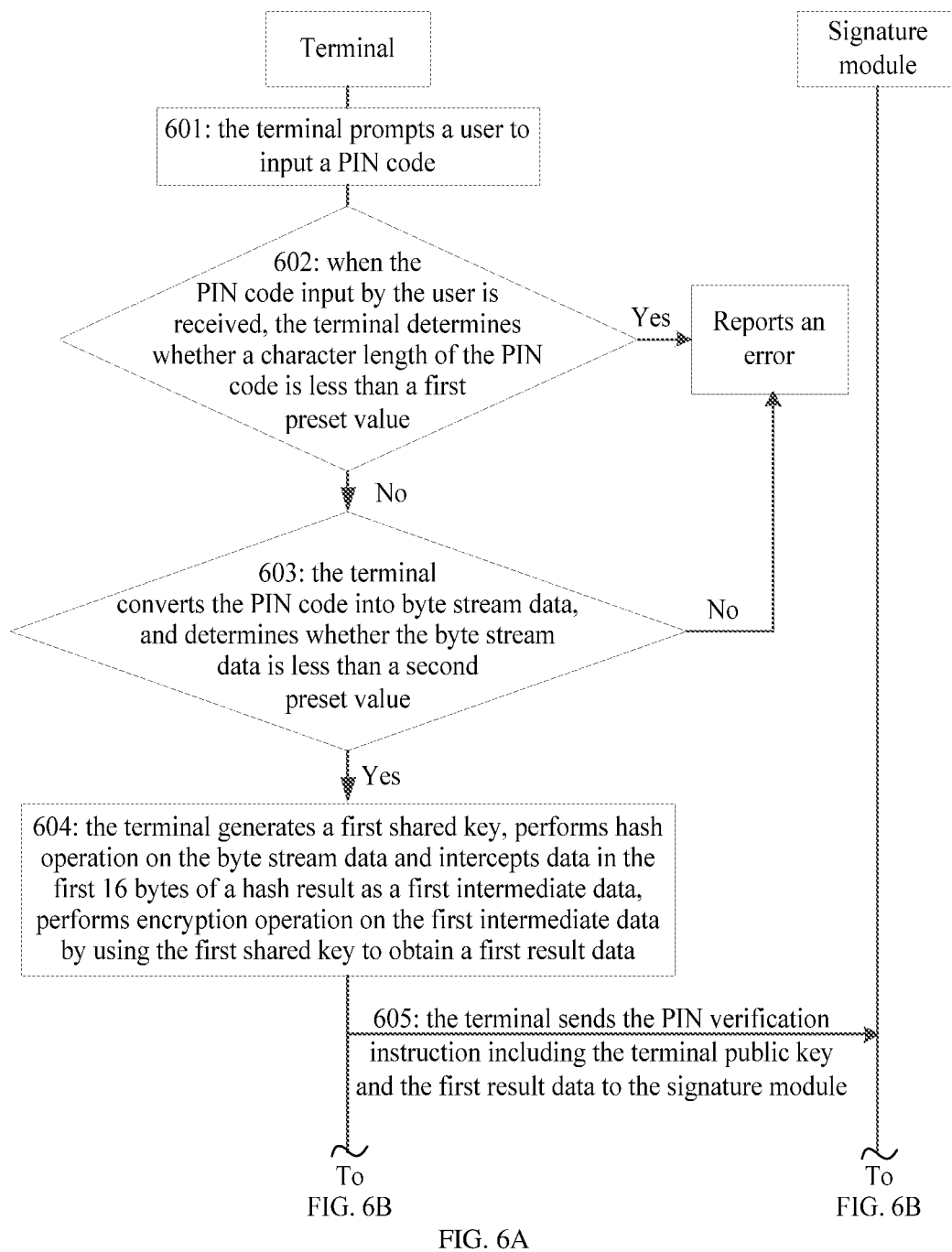
Figure 6B:
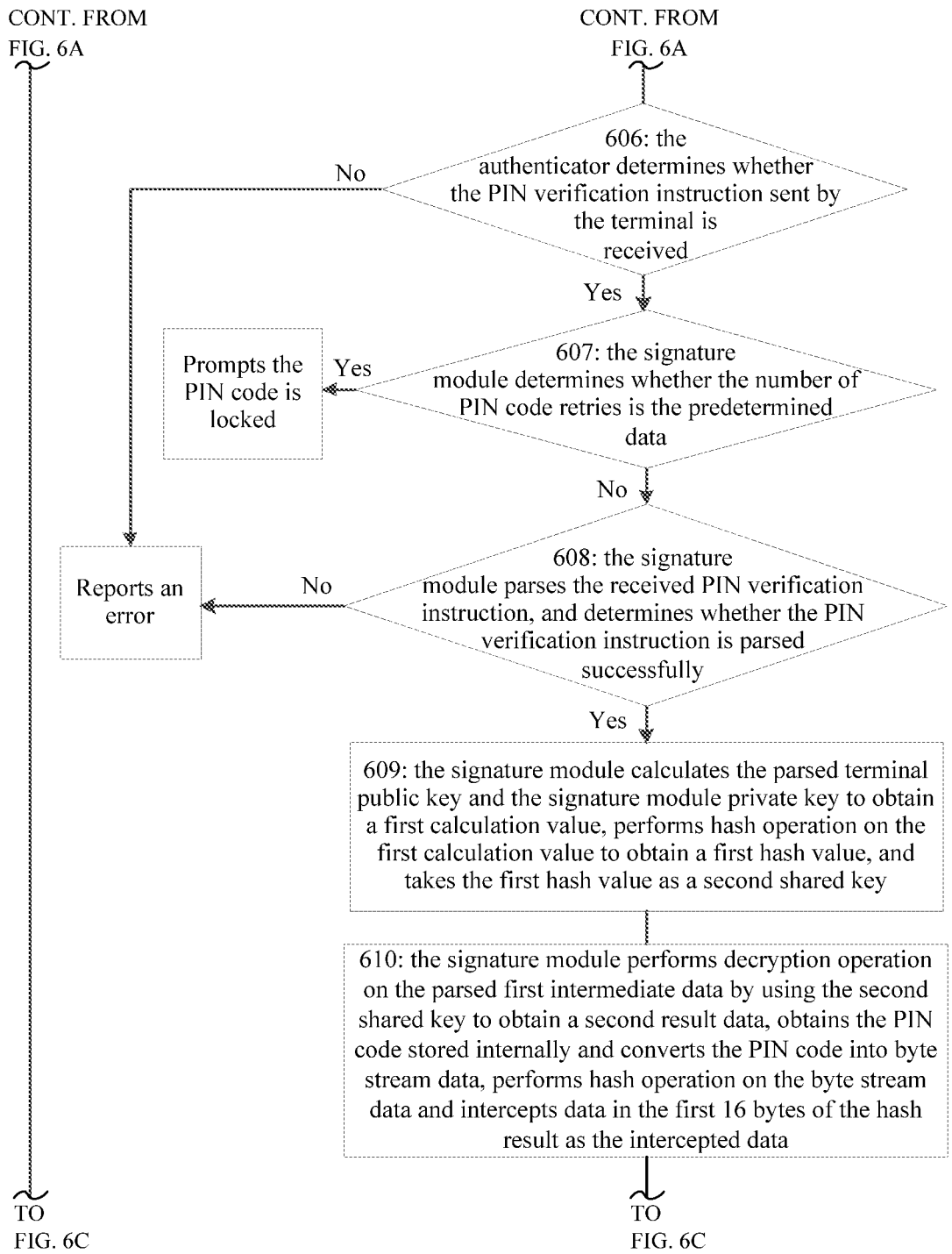
Figure 7A:
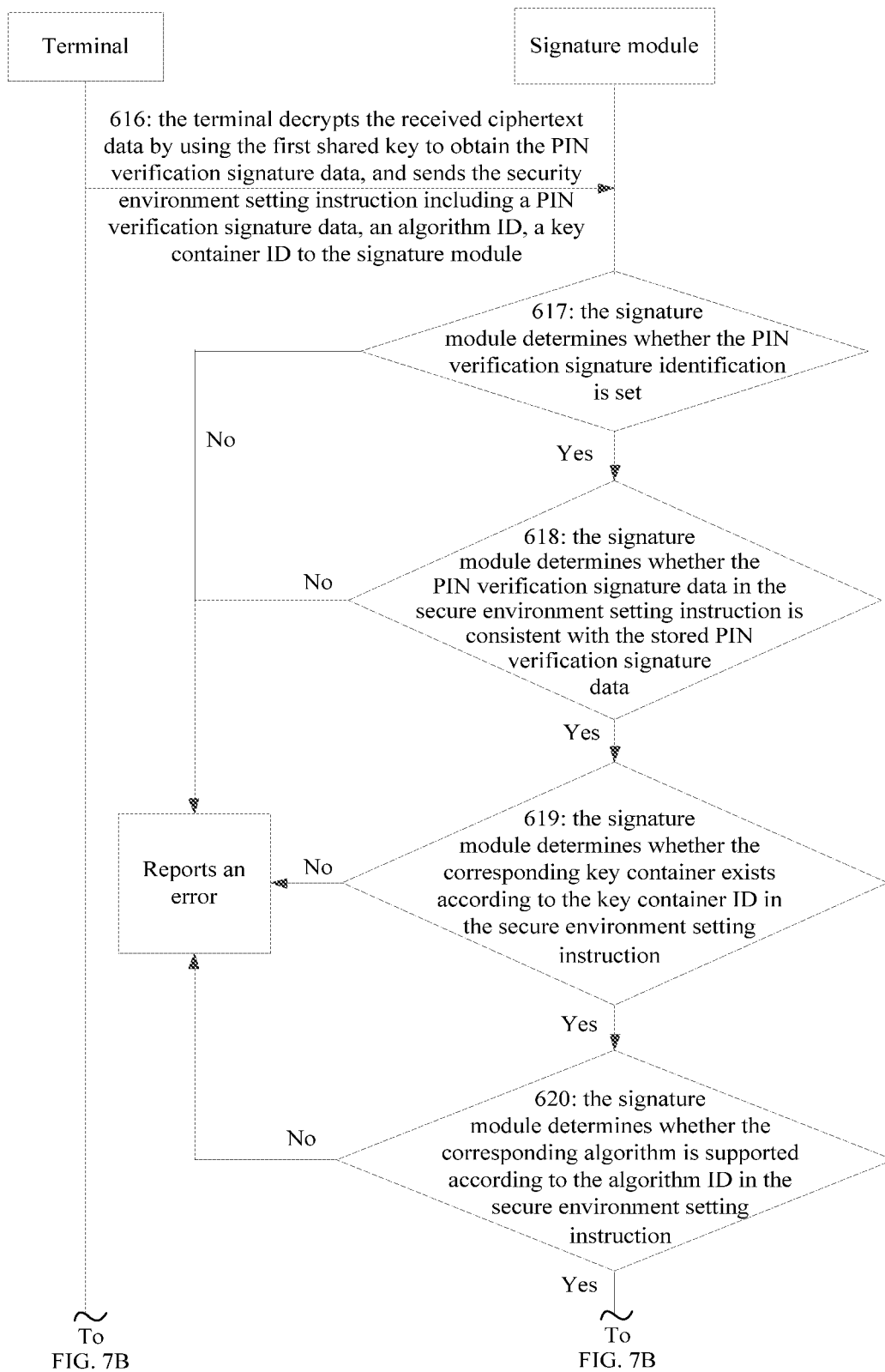
FIG. 7A-7D are flow charts of a method for realizing secure signature according to Embodiment 6 of the present application.
Figure 7B:
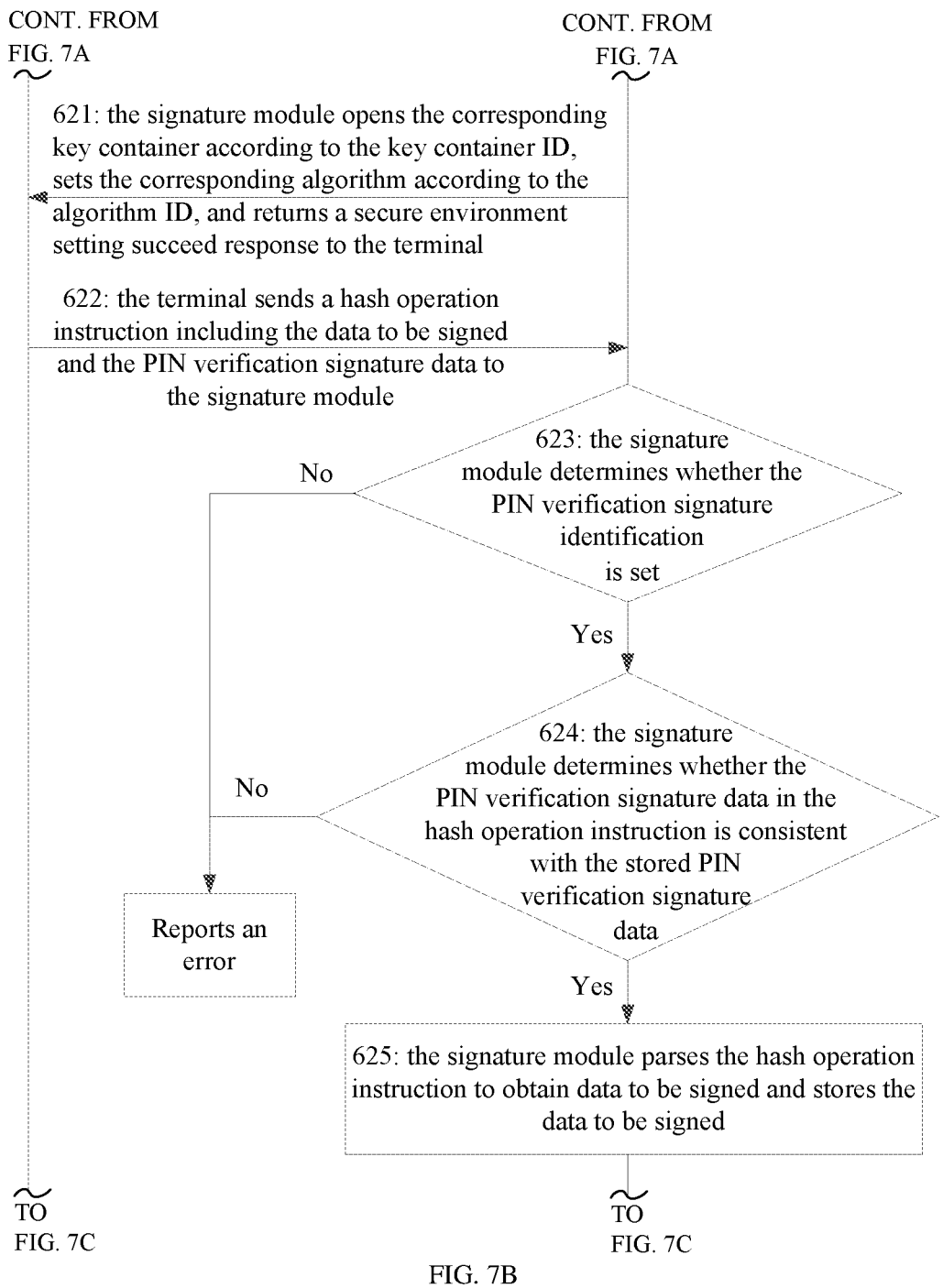
Figure 7C:
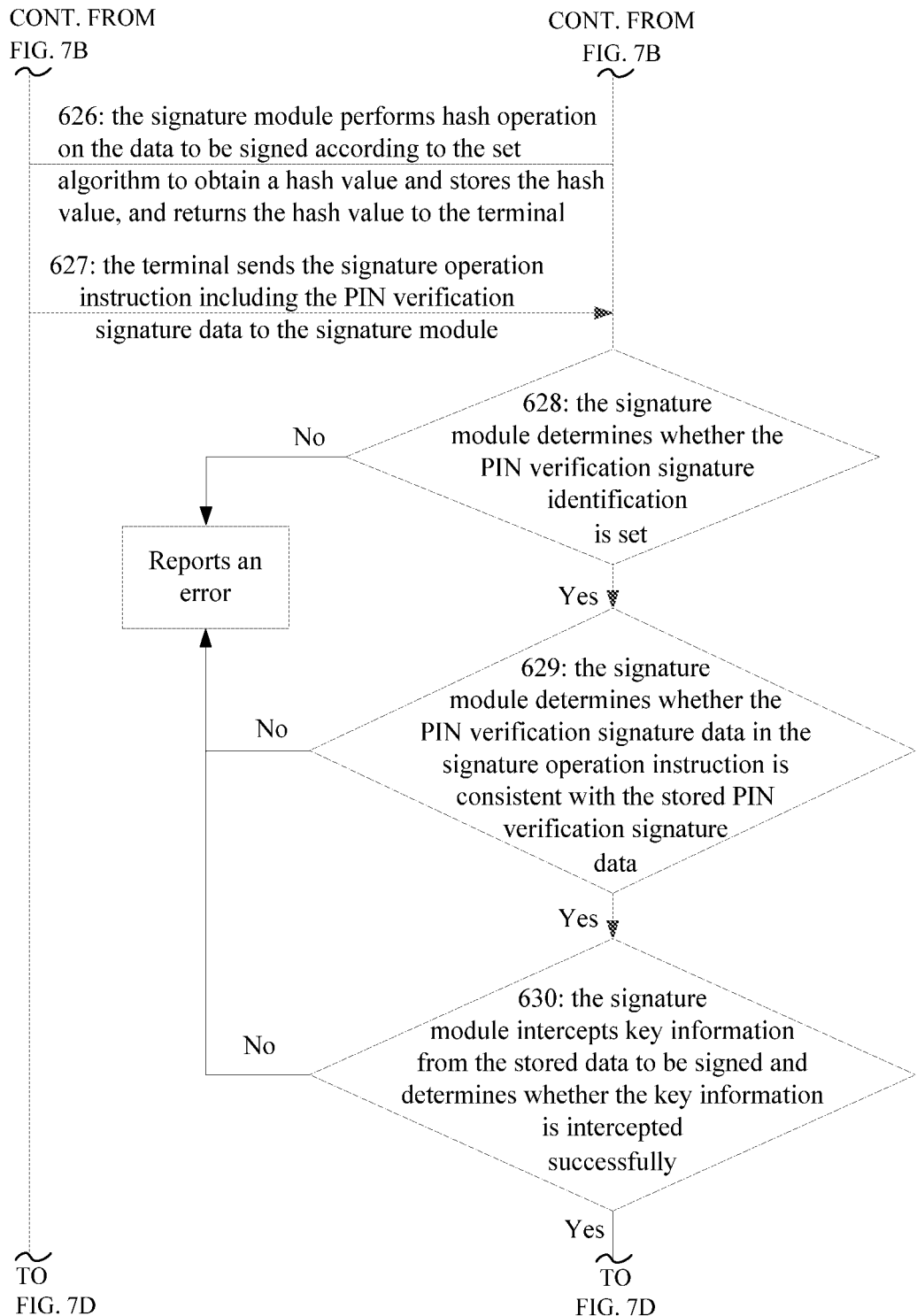
Figure 7D:
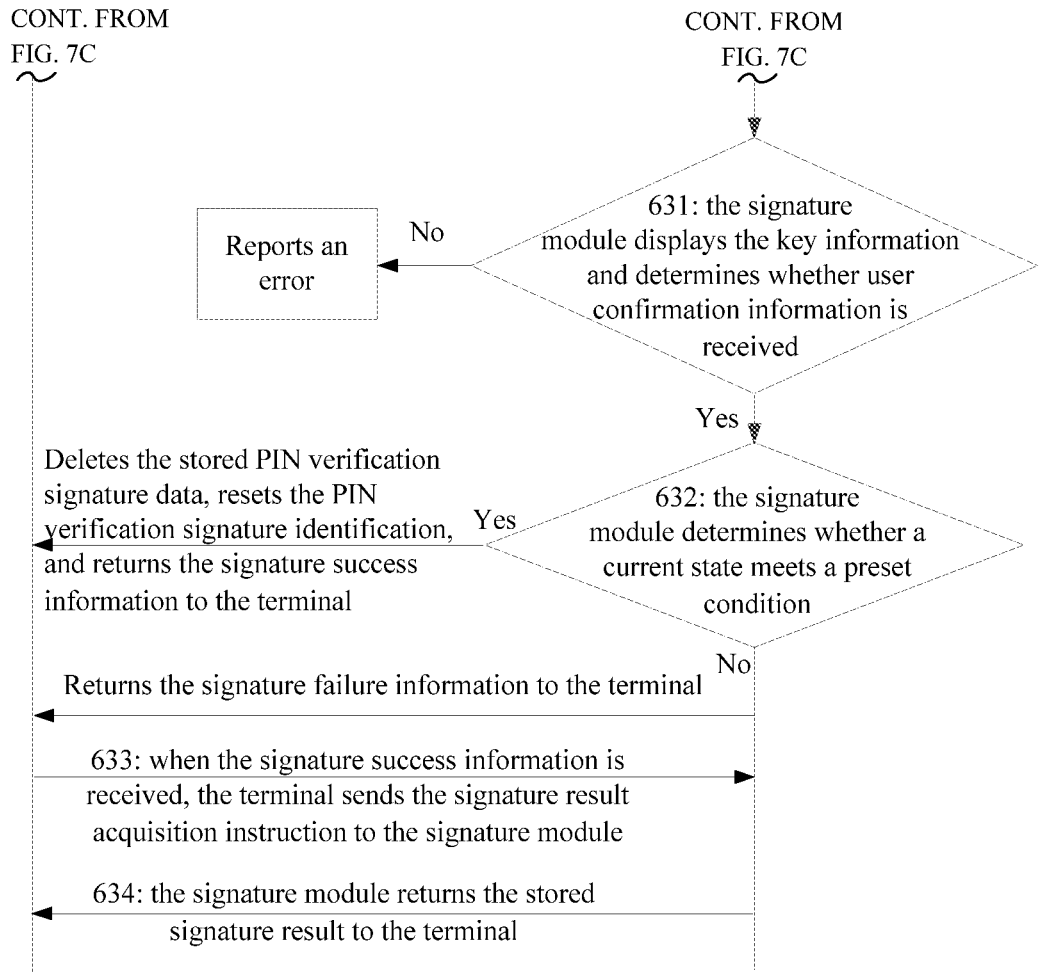

As shown in FIG. 4A-4C, Embodiment 4 of the present application provides a method for acquiring PIN verification signature data, including:

step 401, a terminal prompts a user to input a PIN code;

step 402, when the PIN code input by the user is received, the terminal determines whether a character length of the PIN code is less than a first preset value, if yes, reports an error; otherwise, executes step 403;

for example, in this embodiment, the first preset value is 4;

step 403, the terminal converts the PIN code into byte stream data, and determines whether the byte stream data is less than a second preset value, if yes, executes step 404; otherwise, reports an error;

for example, in this embodiment, the second preset value is 255;

step 404, the terminal generates a first shared key, performs hash operation on the byte stream data and intercepts data in the first 16 byte of an operation result as a first intermediate data, and encrypts the first intermediate data by using the first shared key to obtain a first result data;

the terminal key pair in this embodiment includes a terminal public key and a terminal private key; the process for generating the first shared key is consistent with that of step 204, which will not be repeated herein;

step 405, the terminal sends the PIN verification signature data acquisition instruction including the terminal public key and the first result data to the signature module;

step 406, the signature module determines whether data sent by the terminal is received, if yes, executes step 407; otherwise, reports an error;

step 407, the signature module determines whether the number of PIN code retries is the predetermined data, if yes, prompts the PIN code is locked; otherwise, executes step 408;

step 408, the signature module parses the received PIN verification signature data acquisition instruction, and determines whether the PIN verification signature data acquisition instruction is parsed successfully, if yes, executes step 409; otherwise, reports an error;

step 409, the signature module calculates the parsed terminal public key and a signature module private key to obtain a first calculation value, and performs hash operation on the first calculation value to obtain a first hash value and takes the first hash value as the second shared key;

step 410, the signature module decrypts the parsed first result data by using the second shared key to obtain a second operation result, and obtains a PIN code stored internally, and converts the PIN code into byte stream data, performs hash operation on the byte stream data and intercepts data in the first 16 bytes of the hash result to obtain the intercepted data;

step 411, the signature module determines whether the second operation result is consistent with the intercepted data, if yes, executes step 412; otherwise, executes step 413;

step 412, the signature module generates a first random number as the PIN verification signature data, encrypts the PIN verification signature data by using the second shared key to obtain a ciphertext data, and returns the ciphertext data to the terminal, and modifies the number of PIN code retries to an initial value;

preferably, a length of the first random number in this embodiment is 16 bytes;

step 413, the signature module regenerates a signature module key pair and replaces the stored signature module key pair with the regenerated signature module key pair, and updates the number of PIN code retries;

step 414, the signature module determines whether the number of PIN code retries is the predetermined data, if yes, prompts the PIN code is locked; otherwise, executes step 415;

in this embodiment, if the initial value of the number of the PIN code retries is 0, the predetermined data is a positive integer; if the initial value of the number of the PIN code retries is the positive integer, the predetermined data is 0; step 415, the signature module determines whether verification of the PIN code is failed for three consecutive times, if yes, prompts the verified message of the PIN code is incorrect; otherwise, prompts the input PIN code is incorrect.

Embodiment 5

As shown in FIG. 5A-5D, Embodiment 5 of the present application provides a method for realizing secure signature, including:

step 501, a terminal prompts a user to input a PIN code;

step 502, when the PIN code input by the user is received, the terminal determines whether a character length of the PIN code is less than a first preset value, if yes, report an error; otherwise, executes step 503;

for example, in this embodiment, the first preset value is 4;

step 503, the terminal converts the PIN code into byte stream data, and determines whether the byte stream data is less than a second preset value, if yes, executes step 504; otherwise, reports an error;

for example, in this embodiment, the second preset value is 255;

step 504, the terminal generates a first shared key, performs hash operation on the byte stream data and intercepts data in the first 16 bytes of a hash result as a first intermediate data, and encrypts the first intermediate data by using the first shared key to obtain a first result data;

in this embodiment, the terminal key pair includes a terminal public key and a terminal private key;

specifically, in this embodiment, the terminal generates the first shared key in step 504 includes:

step A1, the terminal sends a shared key acquisition instruction to the signature module;

step A2, when receiving the shared key acquisition instruction, the signature module returns a signature module public key stored in the signature module key pair to the terminal;

step A3, the terminal receives a signature module public key returned from the signature module, generates a terminal key pair, calculates the private key in the terminal key pair and the signature module public key to obtain a first data, performs hash operation on the first data to obtain a hash value, and takes the hash value as a first shared key;

step 505, the terminal sends a PIN verification instruction including the terminal public key and the first result data to the signature module;

step 506, the signature module determines whether the data sent by the terminal is received, if yes, executes step 507; otherwise, reports an error;

step 507, the signature module determines whether the number of PIN code retries is the predetermined data, if yes, prompts the PIN code is locked; otherwise, executes step 508;

step 508, the signature module parses the received PIN verification instruction, and determines whether the PIN verification instruction is parsed successfully, if yes, executes step 509; otherwise, reports an error;

step 509, the signature module calculates the parsed terminal public key and the signature module private key to obtain a first calculation value, performs hash operation on the first calculation value to obtain a first hash value and takes the first hash value as the second shared key;

step 510, the signature module performs decryption operation on the parsed first result data by using the second shared key to obtain a second result data, obtains the stored PIN code and converts the stored PIN code into byte stream data, and performs hash operation on the byte stream data and intercepts data in the first 16 bytes of the hash result as intercepted data;

step 511, the signature module determines whether the intercepted data is consistent with the second result data, if yes, executes step 512; otherwise, executes step 513;

step 512, the signature module sets a PIN verification signature identification, generates a first random number as a PIN verification signature data and stores the PIN verification signature data, and encrypts the PIN verification signature data by using the second shared key to obtain a ciphertext data, and returns the ciphertext data to the terminal, and modifies the number of PIN code retries to an initial value, and executes step 516;

in this embodiment, an initial state of the PIN verification signature identification is 0;

preferably, in this embodiment, a length of the first random number is 16 bytes;

step 513, the signature module regenerates the signature module key pair and replaces the stored signature module key pair with the regenerated signature module key pair, and updates the number of PIN code retries;

in this embodiment, the replaced signature module key pair is used during the next signature;

step 514, the signature module determines whether the number of PIN code retries is the predetermined data, if yes, prompts the PIN code is locked; otherwise, executes step 515;

in this embodiment, if the initial value of the number of PIN code retries is 0, the predetermined data is a positive integer; if the initial value of the number of PIN code retries is a positive integer, the predetermined data is 0;

step 515, the signature module determines whether the verification of the PIN code is failed for three consecutive times, if yes, prompts the verified message of the PIN code is incorrect; otherwise, prompts the input PIN code is incorrect;

step 516, the terminal performs hash operation on data to be signed to obtain a first hash value, decrypts the received ciphertext data by using the first shared key to obtain the PIN verification signature data; takes the PIN verification signature data as the key, and performs HMAC operation on the first hash value to obtain a first intermediate value, intercepts data in the first 16 bytes of the first intermediate value to obtain an intermediate data to be signed;

step 517, the terminal sends a signature operation instruction including the intermediate data to be signed and the PIN verification signature data to the signature module;

step 518, the signature module determines whether the PIN verification signature identification is set and determines whether the PIN verification signature data in the signature operation instruction is consistent with the stored PIN verification signature data, if yes, executes step 519; otherwise, reports an error;

step 519, the signature module signs the intermediate data to be signed in the signature operation instruction by using the signature private key to obtain a signature result and returns the signature result to the terminal, resets the PIN verification signature identification, and clears the stored PIN verification signature data;

in this embodiment, it is a realizing process of once signature after once PIN verification, there are other ways, for example, multiple signature after once PIN verification or signature within a signature valid duration after once PIN verification, etc.;

optionally, for the realizing process of multiple signature after once PIN verification, step 512 further includes: setting the number of times of signature as an initial value; before the resetting the PIN verification signature identification, step 519 further includes: updating the number of times of signature, and determining whether the signature times equals to the preset value, if yes, resetting the PIN verification signature identification, clearing the stored PIN verification signature data; otherwise, reports an error;

optionally, for the realizing process of signature within a signature valid duration after once PIN verification, step 512 further includes: setting the signature valid duration, before resetting the PIN verification signature identification, step 519 further includes: determining whether the current time is in the signature valid duration, if yes, reporting an error; otherwise, resetting the PIN verification signature identification, and clearing the store PIN verification signature data.

Embodiment 6

As shown in FIGS. 6A-6C and FIG. 7A-7D, Embodiment 6 of the present application provides a method for realizing secure signature, including:

step 601, the terminal prompts a user to input a PIN code;

step 602, when the PIN code input by the user is received, the terminal determines whether a character length of the PIN code is less than a first preset value, if yes, reports an error; otherwise, executes step 603;

for example, in this embodiment, the first preset value is 4;

step 603, the terminal converts the PIN code into byte stream data, and determines whether the byte stream data is less than a second preset value, if yes, executes step 604; otherwise, reports an error;

for example, in this embodiment, the second preset value is 225;

step 604, the terminal generates a first shared key, performs hash operation on the byte stream data and intercepts data in the first 16 bytes of a hash result as a first intermediate data, performs encryption operation on the first intermediate data by using the first shared key to obtain a first result data;

in this embodiment, the terminal key pair includes a terminal public key and a terminal private key; the process of generating the first shared key is with the same as that of step 204, which will not be repeated herein;

step 605, the terminal sends the PIN verification instruction including the terminal public key and the first result data to a signature module;

step 606, the signature module determines whether the PIN verification instruction sent by the terminal is received, if yes, executes step 607; otherwise, reports an error;

step 607, the signature module determines whether the number of PIN code retries is the predetermined data, if yes, prompts the PIN code is locked; otherwise, executes step 608;

step 608, the signature module parses the received PIN verification instruction, and determines whether the PIN verification instruction is parsed successfully, if yes, executes step 609; otherwise, reports an error;

step 609, the signature module calculates the parsed terminal public key and the signature module private key to obtain a first calculation value, performs hash operation on the first calculation value to obtain a first hash value, and takes the first hash value as the second shared key;

step 610, the signature module performs decryption operation on the parsed first intermediate data by using the second shared key to obtain a second result data, obtains the PIN code stored internally and converts the PIN code into byte stream data, performs hash operation on the byte stream data and intercepts data in the first 16 bytes of the hash result as the intercepted data;

step 611, the signature module determines whether the second result data is with the same as the intercepted data, if yes, executes step 615; otherwise, executes step 612;

step 612, the signature module regenerates the signature module key pair and replaces the stored signature module key pair with the regenerated signature module key pair, and updates the number of PIN code retries;

step 613, the signature module determines whether the number of PIN code retries is the predetermined data, if yes, prompts the PIN code is locked; otherwise, executes step 614;

in this embodiment, if an initial value of the number of PIN code retries is 0, the predetermined data is a positive integer; if the initial value of the number of PIN code retries is a positive integer, the predetermined data is 0;

step 614, the signature module determines whether the verification of the PIN code is failed for three consecutive times, if yes, prompts the verified message of the PIN code is incorrect; otherwise, prompts the input PIN code is incorrect;

step 615, the signature module sets a PIN verification signature identification, generates a first random number as the PIN verification signature data and stores the PIN verification signature data, encrypts the PIN verification signature data by using the second shared key to obtain a ciphertext data, and returns the ciphertext data to the terminal, and modifies the number of PIN code retries to the initial value, and executes step 616;

step 616, the terminal decrypts the received ciphertext data by using the first shared key to obtain the PIN verification signature data, and sends the security environment setting instruction including a PIN verification signature data, an algorithm ID, a key container ID to the signature module;

step 617, the signature module determines whether the PIN verification signature identification is set, if yes, executes step 618; otherwise, reports an error;

step 618, the signature module determines whether the PIN verification signature data in the secure environment setting instruction is consistent with the stored PIN verification signature data, if yes, executes step 619; otherwise, reports an error;

in this embodiment, the order of step 617 and step 618 can be exchanged;

step 619, the signature module determines whether the corresponding key container exists according to the key container ID in the secure environment setting instruction, if yes, executes step 620; otherwise, reports an error;

step 620, the signature module determines whether the corresponding algorithm is supported according to the algorithm ID in the secure environment setting instruction, if yes, executes step 621; otherwise, reports an error;

step 621, the signature module opens the corresponding key container according to the key container ID, sets the corresponding algorithm according to the algorithm ID, and returns a secure environment setting succeed response to the terminal; step 622, the terminal sends a hash operation instruction including the data to be signed and the PIN verification signature data to the signature module;

step 623, the signature module determines whether the PIN verification signature identification is set, if yes, executes step 624; otherwise, reports an error;

step 624, the signature module determines whether the PIN verification signature data in the hash operation instruction is consistent with the stored PIN verification signature data, if yes, executes step 625; otherwise, reports an error;

step 625, the signature module parses the hash operation instruction to obtain data to be signed and stores the data to be signed;

step 626, the signature module performs hash operation on the data to be signed according to the set algorithm to obtain a hash value and stores the hash value, and returns the hash value to the terminal;

optionally, in this embodiment, the signature module in step 626 can send hash calculation success information instead of sending the hash value;

step 627, the terminal sends the signature operation instruction including the PIN verification signature data to the signature module;

preferably, in this embodiment, before step 627, the method further includes: the terminal performs hash calculation on the data to be signed after receiving the hash value, compares whether the calculation result is consistent with the received hash value, if yes, executes step 627; otherwise, reports an error;

step 628, the signature module determines whether the PIN verification signature identification is set, if yes, executes step 629; otherwise, reports an error;

step 629, the signature module determines whether the PIN verification signature data in the signature operation instruction is consistent with the stored PIN verification signature data, if yes, executes step 630; otherwise, reports an error;

step 630, the signature module intercepts key information from the stored data to be signed and determines whether the key information is intercepted successfully, if yes, executes step 631; otherwise, reports an error;

step 631, the signature module displays the key information and determines whether user confirmation information is received, if yes, the signature module signs the stored hash value by using the signature private key in the corresponding container to obtain a signature result and stores the signature result; otherwise, reports an error;

step 632, the signature module determines whether a current state meets a preset condition, if yes, deletes the stored PIN verification signature data, resets the PIN verification signature identification, and returns the signature success information to the terminal; otherwise, returns the signature failure information to the terminal;

step 633, when the signature success information is received, the terminal sends the signature result acquisition instruction to the signature module;

step 634, the signature module returns the stored signature result to the terminal.

In this embodiment, the order of step 619 and step 620 can be exchanged, the order of step 617 and step 618 can be exchanged, the order of step 623 and step 624 can be reversed, the order of step 628 and step 629 can be exchanged.

Embodiment 7

Figure 8:
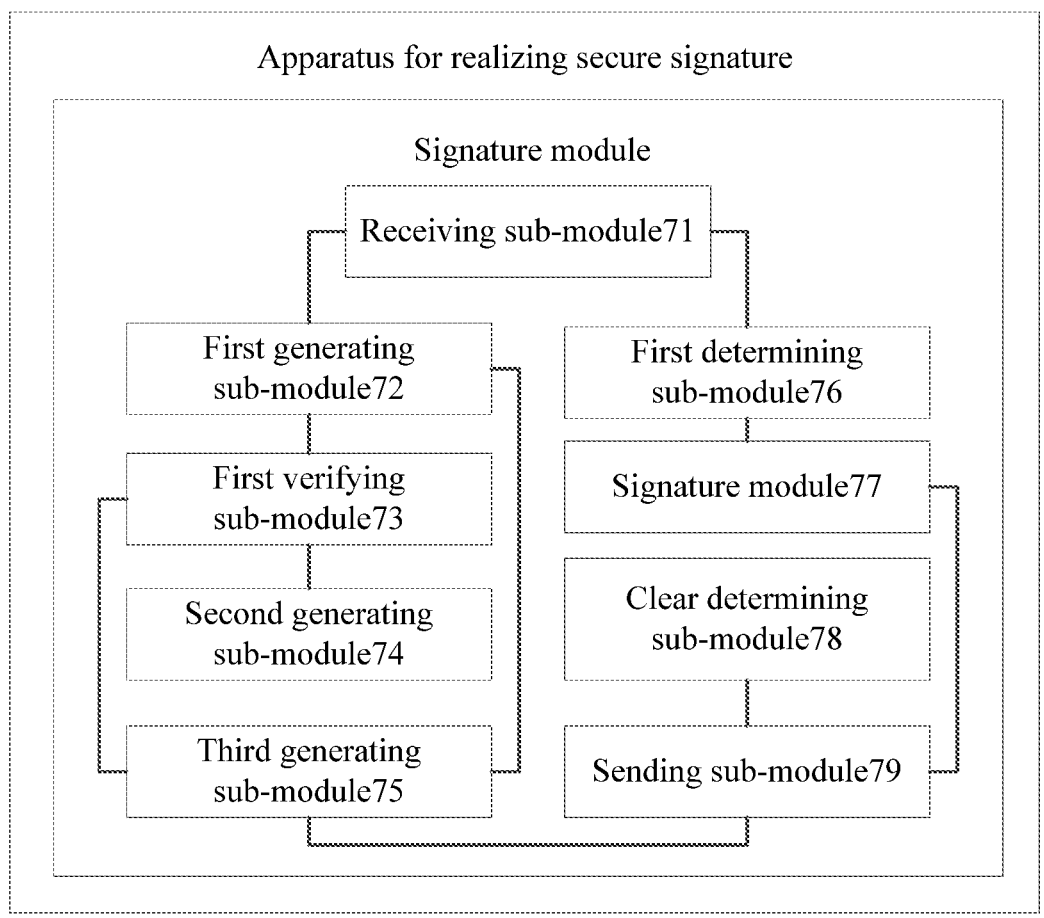
FIG. 8 is a block diagram of an apparatus for realizing secure signature according to Embodiment 7 of the present application.

According to Embodiment 7 of the present application, it provides an apparatus for realizing secure signature, as is shown in FIG. 8, including a signature module, the signature module includes:

a receiving sub-module 71, configured to receive a PIN verification instruction and a signature operation instruction which are sent by a terminal;

a first generating sub-module 72, configured to generate a second shared key according to a terminal public key in the PIN verification instruction and a stored signature module private key when the verifying PIN code instruction is received by the receiving sub-module 71;

in this embodiment, the first generating sub-module 72 is specifically configured to calculate the terminal public key in the PIN verification instruction and the stored signature module private key to obtain a first calculation value, and to perform hash operation on the first calculation value to obtain a first hash value and to take the first hash value as the second shared key;

a first verifying sub-module 73, configured to verify a first calculation result in the PIN verification instruction by using a second shared key generated by the first generating sub-module 72, trigger a third generating sub-module 75 if the verification is successful; and trigger a second generating sub-module 74 if the verification is failed;

in this embodiment, the first verifying sub-module 73 is specifically configured to perform decryption operation on the first calculation result in the PIN verification instruction by using the generated second shared key to obtain a second result data, obtain a stored PIN code, and convert the stored PIN code into second byte stream data, perform hash operation on the second byte stream data and intercept data in the first 16 bytes of a hash result as intercepted data, and determine whether the intercepted data is consistent with the second result data, if yes, the verification is successful, and trigger the third generating sub-module; otherwise, the verification is failed, and trigger the second generating sub-module 74;

the second generating sub-module 74, configured to regenerate a signature module key pair and replace a stored signature module key pair; wherein the signature module key pair comprises a signature module private key and a signature module public key;

the third generating sub-module 75, configured to generate PIN verification signature data and store the PIN verification signature data; and to generate a second calculation result according to the second shared key generated by the first generating sub-module 72 and the PIN verification signature data;

in this embodiment, the third generating sub-module 75 is specifically configured to encrypt the PIN verification signature data by using the second shared key to obtain a ciphertext data, and take the ciphertext data as the second calculation result;

a first determining sub-module 76, configured to determine whether the PIN verification signature data in the signature operation instruction is consistent with stored PIN verification signature data when the signature operation instruction is received by the receiving sub-module 71, if yes, trigger a signing sub-module 77; otherwise, report an error;

the signing sub-module 77 is configured to sign intermediate data to be signed in the signature operation instruction by using a stored signature private key;

a clear determining sub-module 78, configured to determine whether a current state meets a preset condition, if yes, to clear the stored PIN verification signature data;

a sending sub-module 79, configured to send the second calculation result generated by the third generating sub-module to the terminal, and further configured to send a signature result obtained by the signing sub-module to the terminal when the clear determining sub-module makes a positive determination or a negative determination.

Optionally, in this embodiment, the signature module further includes:

a first parsing sub-module, configured to parse the PIN verification instruction received by the receiving sub-module 71, and determine whether the PIN verification instruction is parsed successfully, if yes, trigger the first verifying sub-module 73; otherwise, report an error;

a second parsing sub-module, configured to parse the signature operation instruction received by the receiving sub-module 71, and determine whether the signature operation instruction is parsed successfully, if yes, trigger the first determining sub-module 76; otherwise, report an error.

Optionally, the signature module further includes:

a second determining sub-module, configured to determine whether the number of PIN code retries is the predetermined data, if yes, report an error, prompt the PIN code is locked; otherwise, trigger the first verifying sub-module 73;

for example, in this embodiment, the predetermined data is 0;

a first updating sub-module, configured to update the number of PIN code retries after the verification performed by the first verifying sub-module 73 fails;

for example, the updating the number of PIN code retries specifically is self-subtracting 1 from the number of PIN code retries;

a third determining sub-module, configured to determine whether the number of PIN code retries is the predetermined data, if yes, prompt the PIN code is locked; otherwise, trigger a fourth determining sub-module;

the fourth determining sub-module, configured to determine whether the verification of the PIN code is failed for three consecutive times, if yes, prompt the verified message of the PIN code is incorrect; otherwise, prompt the input PIN code is incorrect;

a first modifying sub-module, configured to modify the number of PIN code retries to an initial value after the verification performed by the first verifying sub-module 73 is successful;

for example, in this embodiment, the initial value is 8;

the apparatus in this embodiment can be applied to re-check signature, the receiving sub-module 71 is further configured to receive the secure environment setting operation instruction, the hash operation instruction and the signature result acquisition instruction which are sent by the terminal;

correspondingly, the signature module further includes:

a fifth determining sub-module, configured to determine whether PIN verification signature data in the secure environment setting operation instruction is consistent with the stored PIN verification signature data when the secure environment setting operation instruction is received by the receiving sub-module 71, if yes, trigger a sixth determining sub-module; otherwise, end;

the sixth determining sub-module is configured to determine whether a signature setting algorithm is legitimate according to an algorithm ID in the secure environment setting instruction and a key container ID, if yes, trigger an opening and setting sub-module; otherwise, end;

in this embodiment, the sixth determining sub-module is specifically configured to determine whether the corresponding key container exists according to the key container ID and determine whether the corresponding algorithm is supported according to the algorithm ID, if the both the determination results are positive, trigger the opening and setting sub-module; otherwise, end;

the opening and setting sub-module is configured to open a corresponding key container according to the key container ID, and setting a corresponding algorithm according to the algorithm ID;

a seventh determining sub-module, configured to determine whether the PIN verification signature data in the hash operation instruction is consistent with the stored PIN verification signature data when the hash operation instruction is received by the receiving sub-module 71, if yes, trigger a parsing and storing sub-module; otherwise, end;

the parsing and storing sub-module is configured to parse the hash operation instruction to obtain data to be signed and store the data to be signed;

a hash operation sub-module, configured to perform hash operation on the data to be signed according to a setting algorithm to obtain a hash value and store the hash value;

the intercepting and determining sub-module is configured to intercept key information from the stored data to be signed and determine whether the key information is intercepted successfully when the first determining sub-module 76 makes a positive determination, if yes, trigger a displaying and determining sub-module; otherwise, end;

the displaying and determining sub-module is configured to display the key information intercepted by the intercepting and determining sub-module, and to determine whether user confirmation is received, if yes, to trigger a signing sub-module 77; otherwise, end;

the signing sub-module 77 is specifically configured to sign the stored hash value by using a signature private key in a container corresponding to the container ID in the signature operation instruction to obtain a signature result and store the signature result;

the sending sub-module 79 is further configured to return a secure environment setting succeed response to the terminal after a corresponding algorithm is set by the opening and setting sub-module; further configured to return a hash calculation success response to the terminal when the operation of the hash operation sub-module is completed; further configured to return signature success information to the terminal when the clear determining sub-module 78 makes a positive determination, and return signature failure information to the terminal when the clear determining sub-module makes a negative determination; further configured to return a signature result stored by the signing and storing sub-module to the terminal when a signature result acquisition instruction sent by the terminal is received by the receiving sub-module 71.

Optionally, the sending sub-module 79 is further configured to return the hash value to the terminal after the hash operating sub-module finishes the operation.

In this embodiment, the third generating sub-module 75 is further configured to set the PIN verification signature identification as valid; specifically is: setting the PIN verification signature identification;

the first determining sub-module 76 is further configured to determine whether the PIN verification signature identification is valid; specifically is: determining whether the PIN verification signature identification is set;

the fifth determining sub-module is further configured to determine whether the PIN verification signature identification is valid; specifically is: determining whether the PIN verification signature identification is set;

the seventh determining sub-module is further configured to determine whether the PIN verification signature identification is valid; specifically is determining whether the PIN verification signature identification is set;

the clear determining sub-module 78 is further configured to set the PIN verification signature identification as invalid when the current state is determined to meet the preset condition; specifically, resetting the PIN verification signature identification.

If the apparatus in this embodiment is applicable to multiple signature after once PIN verification, the third generating sub-module 75 is further configured to set the number of times of signature as the initial value;

the clear determining sub-module 78 is specifically configured to update the number of times of signature, and determine whether the number of times of signature equals to the preset value, if yes, clear the stored PIN verification signature data.

The third generating sub-module 75 is further configured to set signature valid time if the apparatus in this embodiment is applicable to sign with a signature within a preset duration after once PIN verification;

the clear determining sub-module 78 is specifically configured to determine whether the current time is within the signature valid time, if yes, clear the stored PIN verification signature data.

In this embodiment, the receiving sub-module 71 is further configured to receive the PIN code setting instruction;

the signing module further includes:
an eighth determining sub-module, configured to determine whether the PIN code is set when the PIN code setting instruction is received by the receiving sub-module 71, if yes, report an error; otherwise, trigger a second verifying sub-module; the second verifying sub-module, configured to verify the PIN code setting instruction, and if the verification is successful, generate a PIN code according to a first ciphertext in the PIN code setting instruction and store the PIN code; and if the verification is failed, end.

In this embodiment, the second verifying sub-module specifically includes: a hash calculating unit, configured to calculate the stored signature module private key and the terminal public key in the PIN code setting instruction to obtain a first calculation value, and perform hash operation on the first calculation value, and take a hash result as a second shared key;

a first operating and intercepting unit, configured to perform HMAC operation on a first ciphertext in the PIN code setting instruction by using the second shared key to obtain a second operation result, and intercept data in the first 16 bytes of the second operation result to obtain the intercepted data;

a first determining unit, configured to perform HMAC operation on a first ciphertext in the PIN code setting instruction by using the second shared key to obtain a second operation result, and intercept data in the first 16 bytes of the second operation result to obtain the intercepted data;

the generating and storing unit is configured to generate the PIN code according to the first ciphertext in the PIN code setting instruction and store the PIN code.

Specifically, in this embodiment, the generating and storing unit specifically includes:

a decrypting and removing sub-unit, configured to decrypt the first ciphertext in the PIN code setting instruction by using the second shared key to obtain a first decrypted value, and remove padding data from the first decrypted value to obtain a password intermediate value;

a first determining sub-unit, configured to determine whether the password intermediate value is less than a first preset value, if yes, report an error; otherwise, trigger a hash intercepting sub-unit;

the hash intercepting sub-unit is configured to perform hash operation on the password intermediate value to obtain a hash result, and intercept data in the first 16 bytes of the hash result and store the intercepted data as the PIN code.

Optionally, the second verifying sub-module further includes:

the first parsing and determining unit, configured to parse the received PIN code setting instruction, and determine whether the PIN code setting instruction is parsed successfully, if yes, trigger the hash calculating unit; otherwise, report an error.

In this embodiment, the receiving sub-module 71 is further configured to receive a PIN code modifying instruction;

Correspondingly, the signing module further includes:
a third verifying sub-module, configured to verify the PIN code modifying instruction when the PIN code modifying instruction is received by the receiving sub-module 71, and trigger a replacing and storing sub-module if the verifying is successfully; and report an error if the verifying is failed;

specifically, the third verifying sub-module in this embodiment specifically includes:

a calculating and splicing unit, configured to calculate the stored signature module private key and the terminal public key in the PIN code modifying instruction to obtain a first result data, perform hash operation on the first result data to obtain a second shared key; and splice the first encrypted value in the PIN code modifying instruction with the second encrypted value in the PIN code modifying instruction to obtain a second spliced result;

a second operating and intercepting unit, configured to perform HMAC operation on the second spliced result by using the second shared key to obtain a second operation result, and intercept data in the first 16 bytes from the second operation result;

a second determining unit, configured to determine whether the intermediate data in the PIN code modifying instruction is consistent with the intercepted data, if yes, trigger a first decrypting unit; otherwise, report an error;

the first decrypting unit is configured to decrypt the first encrypted value by using the second shared key to obtain a first decrypted value;

a third determining unit, configured to determine whether the first decrypted value is consistent with the stored PIN code, if yes, trigger a replacing and storing sub-module; otherwise, report an error, and regenerate a signature module key pair and replace the stored signature module key pair;

the replacing and storing sub-module is configured to replace the stored PIN code with the PIN code in the PIN code modifying instruction.

Specifically, the replacing and storing sub-module specifically includes:

a decrypting and removing unit, configured to decrypt the second encrypted value by using the second shared key to obtain a second decrypted value, and remove padding data from the second decrypted value to obtain a first intermediate value;

a fourth determining unit, configured to determine whether the length of the first intermediate value is smaller than a first preset value, if yes, trigger a hash replacing unit; otherwise, report an error;

the hash replacing unit is configured to perform hash operation on the first intermediate value to obtain a hash result, intercept data in the first 16 bytes of the hash result, and replace the stored PIN code.

Optionally, the third verifying sub-module further includes:

a second parsing and determining unit, configured to parse the received PIN code modifying instruction, and determine whether the PIN code modifying instruction is parsed successfully, if yes, trigger the calculating and splicing unit; otherwise, report an error.

Optionally, the hash intercepting sub-unit is further configured to set the number of PIN code retries as an initial value;

the hash replacing unit is further configured to modify the number of PIN code retries to an initial value;

the third verifying sub-module further includes:

a fifth determining unit, configured to determine whether the number of PIN code retries is predetermined data, if yes, prompt the PIN code is locked; otherwise, trigger the calculating and splicing unit;

a first updating and determining unit, configured to update the number of PIN code retries when the determination result of the third determining unit is positive; and determine whether the number of PIN code retries is the predetermined data, if yes, prompt the PIN code is locked; otherwise, trigger a sixth determining unit;

the sixth determining unit is configured to determine whether the verification of the PIN code is failed for three consecutive times, if yes, prompt the verified message of the PIN code is incorrect; otherwise, prompt the input PIN code is incorrect.

In this embodiment, the receiving sub-module 71 is further configured to receive a PIN verification signature data acquisition instruction;

correspondingly, the signature module further includes:

a fourth verifying sub-module, configured to verify the PIN verification signature data acquisition instruction when the PIN verification signature data acquisition instruction is received by the receiving sub-module 71, if the verification is successful, trigger a fourth generating sub-module; and if the verification is failed;

specifically, the fourth verifying sub-module specifically includes:

a hash calculating unit, configured to calculate a terminal public key in the PIN verification signature data acquisition instruction and the stored signature module private key to obtain a first calculation value, and perform hash operation on the first calculation value to obtain a first hash value and take the first hash value as the second shared key;

a decrypting and intercepting unit, configured to decrypt a first calculation result in the PIN verification signature data acquisition instruction by using the second shared key to obtain a second result data, acquire a PIN code stored internally, and convert the PIN code into byte stream data, perform hash operation on the byte stream data and intercept data in the first 16 bytes of a hash result to obtain the intercepted data;

a seventh determining unit, configured to determine whether the second result data is consistent with the intercepted data, if yes, the verification is successful, trigger a fourth generating sub-module; otherwise, the verification is failed, and regenerate the signature module key pair and replace the stored signature module key pair.

the fourth generating sub-module is configured to generate the PIN verification signature data;

preferably, the fourth generating sub-module is specifically configured to generate a first random number as the PIN verification signature data, and encrypt the PIN verification signature data by using the second shared key to obtain a ciphertext data;

the sending sub-module 79 is further configured to send the PIN verification signature data generated by the fourth verifying sub-module to the terminal.

Correspondingly, the sending sub-module 79 is further configured to return the ciphertext data generated by the fourth verifying sub-module to the terminal.

Optionally, the fourth verifying sub-module further includes:

a third parsing and determining unit, configured to parse the received PIN verification signature data acquisition instruction, and determine whether the received PIN verification signature data acquisition instruction is parsed successfully, if yes, trigger the hash calculating unit; otherwise, report an error.

Preferably, the hash intercepting sub-unit is further configured to set the number of PIN code retries as the initial value;

the seventh determining unit is further configured to modify the number of PIN code retries to the initial value when the determination result of the seventh determining unit is positive;

the fourth verifying sub-module further includes:
an eighth determining unit, configured to determine whether the number of PIN code retries is the predetermined data, if yes, prompt PIN code is locked; otherwise, trigger the hash calculating unit;
a second updating and determining unit, configured to update the number of PIN code retries when the determination result of the seventh determining unit is negative; and determine whether the number of PIN code retries is the predetermined data, if yes, prompt PIN code is locked; otherwise, trigger a ninth determining unit;
the ninth determining unit is configured to determine whether the verification of the PIN code is failed for three consecutive times, if yes, prompt the verified message of the PIN code is incorrect; otherwise, prompt the input PIN code is incorrect.

In this embodiment, the receiving sub-module 71 in this embodiment is further configured to receive a shared key negotiation instruction sent by the terminal;
correspondingly, the signature module further includes:
a fifth generating sub-module, configured to generate the signature module key pair and store the signature module key pair when shared key negotiation instruction is received by the receiving sub-module 71;
the sending sub-module 79 is further configured to return the signature module public key in the signature module key pair to the terminal.

In this embodiment, the signature module is a hardware device, a computer program or a combination of the hardware device and the computer program.

According to an embodiment of the present application, it provides another apparatus for realizing secure signature, the apparatus includes a processor and a memory; the memory is configured to store operation instructions; the processor is configured to execute steps of:
step F1, when a personal identification number (PIN) verification instruction sent by a terminal is received, generating a second shared key according to a terminal public key and a stored signature module private key in the PIN verification instruction, and verifying a first calculation result in the PIN verification instruction by using the second shared key, if the verifying is successful, executing step F2; if the verifying is failed, regenerating a signature module key pair and replacing a stored signature module key pair; wherein the signature module key pair comprises a signature module private key and a signature module public key;
step F2, generating PIN verification signature data and storing the PIN verification signature data, generating a second calculation result according to the second shared key and the PIN verification signature data, and sending the second calculation result to the terminal;
step H1, when a signature operation instruction sent by the terminal is received, determining whether a PIN verification signature data in the signature operation instruction is consistent with the stored PIN verification signature data, if yes, executing step H2; otherwise, reporting an error;
step H2, signing intermediate data to be signed in the signature operation instruction by using a stored signature module private key;
step H3, determining whether a current state meets a preset condition, if yes, clearing the stored PIN verification signature data, and returning a signature result to the terminal; otherwise, returning the signature result to the terminal.

In an embodiment, the processor is further configured to call the operation instructions to execute steps of:
performing decryption operation on the first calculation result in the PIN verification instruction by using the generated second shared key to obtain a second result data, obtaining an PIN code stored internally and converting the PIN code stored internally to second byte stream data, performing hash operation on the second byte stream data and intercepting data in the first 16 bytes of a hash result as intercepted data, and determining whether the intercepted data is consistent with the second result data, if yes, the verifying is successful; otherwise, the verifying is failed.

In an embodiment, the processor is further configured to call the operation instructions to execute steps of: calculating the terminal public key in the PIN verification instruction and the stored signature module private key to obtain a first calculation value, and performing hash operation on the first calculation value to obtain a first hash value and taking the first hash value as the second shared key.

In an embodiment, wherein the step H1 and the step H2 can be replaced by:
step P1, when a secure environment setting operation instruction sent by the terminal is received, determining whether a PIN verification signature data in the secure environment setting operation instruction is consistent with the stored PIN verification signature data, if yes, executing step P2; otherwise, ending;
step P2, determining whether a signature setting algorithm is legitimate according to an algorithm identification (ID) and a key container ID in the secure environment operation setting instruction, if yes, executing step P3; otherwise, ending;
step P3, opening a corresponding key container according to the key container ID, and setting a corresponding algorithm according to the algorithm ID, and returning a secure environment setting succeed response to the terminal;
step T1, when a hash operation instruction sent by the terminal is received, determining whether a PIN verification signature data in the hash operation instruction is consistent with the stored PIN verification signature data, if yes, executing step T2; otherwise, ending;
step T2, parsing the hash operation instruction to obtain data to be signed and storing the data to be signed;
step T3, performing hash operation on the data to be signed according to a set algorithm to obtain a hash value and storing the hash value, and returning a hash operation successful response to the terminal;
step Q1, when the signature operation instruction sent by the terminal is received, determining whether the PIN verification signature data in the signature operation instruction is consistent with the stored PIN verification signature data, if yes, executing step Q2; otherwise, ending;
step Q2, intercepting key information from the stored data to be signed and determining whether the intercepting is successful, if yes, executing step Q3; otherwise, ending;
step Q3, displaying the key information and determining whether user confirmation information is received, if yes, signing the stored hash value by using a signature private key in a container corresponding to a container ID in the signature operation instruction to obtain a signature result and storing the signature result; otherwise, ending;

step Q4, determining whether the current state meets the preset condition, if yes, clearing the stored PIN verification signature data, and returning signature success information to the terminal; otherwise, returning signature failure information to the terminal;

step L1, when a signature result acquisition instruction sent by the terminal is received, returning the signature result to the terminal.

In an embodiment, the processor is further configured to call the operation instructions to execute steps of:

when a PIN code setting instruction is received, determining whether a PIN code is set, if yes, reporting an error; otherwise, verifying the PIN code setting instruction, if the verifying is successful, generating a PIN code according to a first ciphertext in the PIN code setting instruction and storing the PIN code; if the verifying is failed, ending.

In an embodiment, the processor is further configured to call the operation instructions to execute steps of:

step M1, calculating the stored signature module private key and a terminal public key in the PIN code setting instruction to obtain a first calculation value, performing hash operation on the first calculation value, and taking a hash result as the second shared key;

step M2, performing hash-based message authentication code (HMAC) operation on the first ciphertext in the PIN code setting instruction by using the second shared key to obtain a second operation result, and intercepting data in the first 16 bytes of the second operation result to obtain the intercepted data;

step M3, determining whether the intercepted data is consistent with first result data in the PIN code setting instruction, if yes, the verifying is successful; otherwise, the verifying is failed.

In an embodiment, the processor is further configured to call the operation instructions to execute steps of:

step N1, decrypting the first ciphertext in the PIN code setting instruction by using the second shared key to obtain a first decrypted value, removing padding data in the first decrypted value to obtain a password intermediate value;

step N2, determining whether the password intermediate value is less than a first preset value, if yes, reporting an error; otherwise, executing step N3;

step N3, performing hash operation on the password intermediate value to obtain a hash result, and intercepting data in the first 16 bytes of the hash result and storing the intercepted data as the PIN code.

In an embodiment, the processor is further configured to call the operation instructions to execute steps of:

when a PIN verification signature data acquisition instruction is received, verifying the PIN verification signature data acquisition instruction, if the verifying is successful, generating the PIN verification signature data and sending the PIN verification signature data to the terminal; and if the verifying is failed, ending.

In an embodiment, the processor is further configured to call the operation instructions to execute steps of:

step R1, calculating a terminal public key in the PIN verification signature data acquisition instruction and the stored signature module private key to obtain a first calculation value, performing hash operation on the first calculation value to obtain a first hash value and taking the first hash value as the second shared key;

step R2, performing decryption operation on a first calculation result in the PIN verification signature data acquisition instruction by using the second shared key to obtain second result data, obtaining a PIN code stored internally, and converting the PIN code stored internally to byte stream data, performing hash operation on the byte stream data and intercepting data in the first 16 bytes of a hash result to obtain intercepted data;

step R3, determining whether the second result data is consistent with the intercepted data, if yes, the verifying is successful; otherwise, the verifying is failed, and regenerating a signature module key pair and replacing the stored signature module key pair.

In an embodiment, the processor is further configured to call the operation instructions to execute steps of: generating a first random number as the PIN verification signature data, encrypting the PIN verification signature data by using the second shared key to obtain a ciphertext data, and returning the ciphertext data to the terminal.

The above are only preferred specific implementations of the present application, are not to be construed as limiting the scope of the present application. The variations or substitution easily obtained by those skilled in the art within the scope disclosed by the present application should be within the scope of the present application. Therefore, the scope of the present application should be determined by the scope of the appended claims

What is claimed is:

1. A method for realizing secure signature, comprising:

step F1, when a personal identification number (PIN) verification instruction sent by a terminal is received, generating, by a signature module, a shared key according to a terminal public key in the PIN verification instruction and a signature module private key stored in the signature module, and verifying first result data in the PIN verification instruction by using the shared key, if the verifying is successful, executing step F2; if the verifying is failed, regenerating a signature module key pair and replacing a stored signature module key pair; wherein the signature module key pair comprises a signature module private key and a signature module public key;

step F2, generating, by the signature module, a random number as first PIN verification signature data and storing the first PIN verification signature data, generating a calculation result by encrypting the first PIN verification signature data by using the shared key, and sending the second calculation result to the terminal;

step H1, when a signature operation instruction sent by the terminal is received, determining, by the signature module, whether second PIN verification signature data in the signature operation instruction is consistent with the first PIN verification signature data, if yes, executing step H2; otherwise, reporting an error;

step H2, signing, by the signature module, to-be-signed intermediate data in the signature operation instruction by using a stored signature private key to obtain a signature result; and step H3, returning, by the signature module, the signature result to the termina, and determining whether a current state meets a preset condition, if yes, clearing the first PIN verification signature data, otherwise ending, wherein the current state comprises signature times or a signature valid duration;

wherein the step F2 further comprises: setting the signature times as an initial value;

and the determining whether the current state meets the preset condition comprises: updating the signature times, and determining whether the signature times equal to a preset value, if yes, determining that the current states meets the preset condition; otherwise, determining that the current states does not meet the preset condition;

or, the step F2 further comprises: setting the signature valid duration;

and the determining whether the current state meets the preset condition comprises:

determining whether a current time is in the signature valid duration; if yes, determining that the current states meets the preset condition; otherwise, determining that the current states does not meet the preset condition.

2. The method according to claim 1, wherein the verifying of the first result data in the PIN verification instruction by using the shared key comprises:

performing, by the signature module, decryption operation on the first result data in the PIN verification instruction by using the generated shared key to obtain a second result data, obtaining an PIN code stored internally and converting the PIN code stored internally to first byte stream data, performing hash operation on the first byte stream data and intercepting data in first 16 bytes of a hash result as intercepted data, and determining whether the intercepted data is consistent with the second result data, if yes, the verifying is successful; otherwise, the verifying is failed.

3. The method according to claim 1, wherein the generating of the shared key according to the terminal public key in the PIN verification instruction and the stored signature module private key comprises: calculating, by the signature module, the terminal public key in the PIN verification instruction and the stored signature module private key to obtain a first calculation value, and performing hash operation on the first calculation value to obtain a first hash value and taking the first hash value as the shared key.

4. The method according to claim 1, further comprising replace the step H1 and the step H2 with:

step P1, when a secure environment setting operation instruction sent by the terminal is received, determining, by the signature module, whether third PIN verification signature data in the secure environment setting operation instruction is consistent with the first PIN verification signature data, if yes, executing step P2; otherwise, ending;

step P2, determining, by the signature module, whether a signature setting algorithm is legitimate according to an algorithm identification (ID) and a key container ID in the secure environment setting instruction, if yes, executing step P3; otherwise, ending;

step P3, opening, by the signature module, a corresponding key container according to the key container ID, and setting a corresponding algorithm according to the algorithm ID, and returning a secure environment setting succeed response to the terminal;

step T1, when a hash operation instruction sent by the terminal is received, determining, by the signature module, whether fourth PIN verification signature data in the hash operation instruction is consistent with the first PIN verification signature data, if yes, executing step T2; otherwise, ending;

step T2, parsing, by the signature module, the hash operation instruction to obtain data to be signed and storing the data to be signed;

step T3, performing, by the signature module, hash operation on the data to be signed according to a set algorithm to obtain a hash value and storing the hash value, and returning a hash operation successful response to the terminal;

step Q1, when the signature operation instruction sent by the terminal is received, determining, by the signature module, whether second PIN verification signature data in the signature operation instruction is consistent with the first PIN verification signature data, if yes, executing step Q2; otherwise, ending;

step Q2, intercepting, by the signature module, key information from the stored data to be signed and determining whether the intercepting is successful, if yes, executing step Q3; otherwise, ending;

step Q3, displaying, by the signature module, the key information and determining whether user confirmation information is received, if yes, signing, by the signature module, the stored hash value by using a signature private key in a container corresponding to a container ID in the signature operation instruction to obtain a signature result and storing the signature result; otherwise, ending;

step Q4, determining, by the signature module, whether the current state meets the preset condition, if yes, clearing the first PIN verification signature data, and returning signature success information to the terminal; otherwise, returning signature failure information to the terminal; and step L1, when a signature result acquisition instruction sent by the terminal is received, returning, by the signature module, the signature result to the terminal.

5. The method according to claim 1, further comprising:

when a PIN code setting instruction is received, determining, by the signature module, whether a PIN code is set, if yes, reporting an error; otherwise, verifying the PIN code setting instruction, if the verifying is successful, generating a PIN code according to a first ciphertext in the PIN code setting instruction and storing the PIN code; if the verifying is failed, ending a process of verifying the PIN code setting instruction.

6. The method according to claim 5, wherein verifying, by the signature module, the PIN code setting instruction comprises:

step M1, calculating, by the signature module, the stored signature module private key and a terminal public key in the PIN code setting instruction to obtain a first calculation value, performing hash operation on the first calculation value, and taking a hash result as the shared key;

step M2, performing, by the signature module, hash-based message authentication code (HMAC) operation on the first ciphertext in the PIN code setting instruction by using the shared key to obtain a second operation result, and intercepting data in first 16 bytes of the second operation result to obtain the intercepted data; and step M3, determining, by the signature module, whether the intercepted data is consistent with first result data in the PIN code setting instruction, if yes, the verifying is successful;

otherwise, the verifying is failed.

7. The method according to claim 6, wherein the generating of the PIN code according to the first ciphertext in the PIN code setting instruction and storing the PIN code comprises:

step N1, decrypting, by the signature module, the first ciphertext in the PIN code setting instruction by using the shared key to obtain a first decrypted value, removing padding data in the first decrypted value to obtain a password intermediate value;

step N2, determining, by the signature module, whether the password intermediate value is less than a first preset value, if yes, reporting an error; otherwise, executing step N3; and step N3, performing, by the signature module, hash operation on the password intermediate value to obtain a hash result, and intercepting data in first 16 bytes of the hash result and storing the intercepted data as the PIN code.

8. The method according to claim 7, further comprising: when a PIN verification signature data acquisition instruction is received, verifying, by the signature module, the PIN verification signature data acquisition instruction, if the verifying is successful, generating the first PIN verification signature data and sending the first PIN verification signature data to the terminal; and if the verifying is failed, ending.

9. The method according to claim 8, wherein the verifying of the PIN verification signature data acquisition instruction comprises:

step R1, calculating, by the signature module, a terminal public key in the PIN verification signature data acquisition instruction and the stored signature module private key to obtain a first calculation value, performing hash operation on the first calculation value to obtain a first hash value and taking the first hash value as the shared key;

step R2, performing, by the signature module, decryption operation on the first result data in the PIN verification signature data acquisition instruction by using the shared key to obtain second result data, obtaining a PIN code stored internally, and converting the PIN code stored internally to second byte stream data, performing hash operation on the second byte stream data and intercepting data in first 16 bytes of a hash result to obtain intercepted data; and step R3, determining, by the signature module, whether the second result data is consistent with the intercepted data, if yes, the verifying is successful; otherwise, the verifying is failed, and regenerating a signature module key pair and replacing the stored signature module key pair.

10. The method according to claim 8, wherein the generating of the first PIN verification signature data and sending the first PIN verification signature data to the terminal comprises: encrypting the first PIN verification signature data by using the shared key to obtain a ciphertext data, and returning the ciphertext data to the terminal.

11. An apparatus for realizing secure signature, comprising a processor and a memory;

the processor is configured to call the operation instructions to execute steps of:

step F1, when a personal identification number (PIN) verification instruction sent by a terminal is received, generating a shared key according to a terminal public key in the PIN verification instruction and a signature module private key stored in the signature module, and verifying first result data in the PIN verification instruction by using the shared key, if the verifying is successful, executing step F2; if the verifying is failed, regenerating a signature module key pair and replacing a stored signature module key pair; wherein the signature module key pair comprises a signature module private key and a signature module public key;

step F2, generating a random number as first PIN verification signature data and storing the first PIN verification signature data, generating a calculation result by encrypting the first PIN verification signature data by using the shared key, and sending the calculation result to the terminal;

step H1, when a signature operation instruction sent by the terminal is received, determining whether second PIN verification signature data in the signature operation instruction is consistent with the first PIN verification signature data, if yes, executing step H2; otherwise, reporting an error;

step H2, signing to-be-signed intermediate data in the signature operation instruction by using a stored signature module private key to obtain a signature result; and step H3, returning the signature result to the terminal, and determining whether a current state meets a preset condition, if yes, clearing the first PIN verification signature data; otherwise, ending, wherein the current state comprises signature times or a signature valid duration;

wherein the step F2 further comprises: setting the signature times as an initial value;

and the determining whether the current state meets the preset condition comprises: updating the signature times, and determining whether the signature times equal to a preset value, if yes, determining that the current states meets the preset condition; otherwise, determining that the current states does not meet the preset condition;

or, the step F2 further comprises: setting the signature valid duration;

and the determining whether the current state meets the preset condition comprises: determining whether a current time is in the signature valid duration; if yes, determining that the current states meets the preset condition; otherwise, determining that the current states does not meet the preset condition.

12. The apparatus according to claim 11, wherein the processor is further configured to call the operation instructions to execute steps of:

performing decryption operation on the first result data in the PIN verification instruction by using the generated shared key to obtain a second result data, obtaining an PIN code stored internally and converting the PIN code stored internally to first byte stream data, performing hash operation on the first byte stream data and intercepting data in first 16 bytes of a hash result as intercepted data, and determining whether the intercepted data is consistent with the second result data, if yes, the verifying is successful; otherwise, the verifying is failed.

13. The apparatus according to claim 11, wherein the processor is further configured to call the operation instructions to execute steps of: calculating the terminal public key in the PIN verification instruction and the stored signature module private key to obtain a first calculation value, and performing hash operation on the first calculation value to obtain a first hash value and taking the first hash value as the shared key.

14. The apparatus according to claim 11, wherein the step H1 and the step H2 can be replaced by:

step P1, when a secure environment setting operation instruction sent by the terminal is received, determining whether third PIN verification signature data in the secure environment setting operation instruction is consistent with the first PIN verification signature data, if yes, executing step P2; otherwise, ending;

step P2, determining whether a signature setting algorithm is legitimate according to an algorithm identification (ID) and a key container ID in the secure environment operation setting instruction, if yes, executing step P3; otherwise, ending;

step P3, opening a corresponding key container according to the key container ID, and setting a corresponding algorithm according to the algorithm ID, and returning a secure environment setting succeed response to the terminal;

step T1, when a hash operation instruction sent by the terminal is received, determining whether fourth PIN verification signature data in the hash operation instruction is consistent with the first PIN verification signature data, if yes, executing step T2; otherwise, ending;

step T2, parsing the hash operation instruction to obtain data to be signed and storing the data to be signed;

step T3, performing hash operation on the data to be signed according to a set algorithm to obtain a hash value and storing the hash value, and returning a hash operation successful response to the terminal;

step Q1, when the signature operation instruction sent by the terminal is received, determining whether second PIN verification signature data in the signature operation instruction is consistent with the first PIN verification signature data, if yes, executing step Q2; otherwise, ending;

step Q2, intercepting key information from the stored data to be signed and determining whether the intercepting is successful, if yes, executing step Q3; otherwise, ending;

step Q3, displaying the key information and determining whether user confirmation information is received, if yes, signing the stored hash value by using a signature private key in a container corresponding to a container ID in the signature operation instruction to obtain a signature result and storing the signature result; otherwise, ending;

step Q4, determining whether the current state meets the preset condition, if yes, clearing the first PIN verification signature data, and returning signature success information to the terminal; otherwise, returning signature failure information to the terminal; and step L1, when a signature result acquisition instruction sent by the terminal is received, returning the signature result to the terminal.

15. The apparatus according to claim 11, wherein the processor is further configured to call the operation instructions to execute steps of:

when a PIN code setting instruction is received, determining whether a PIN code is set, if yes, reporting an error; otherwise, verifying the PIN code setting instruction, if the verifying is successful, generating a PIN code according to a first ciphertext in the PIN code setting instruction and storing the PIN code; if the verifying is failed, ending a process of verifying the PIN code setting instruction.

16. The apparatus according to claim 15, wherein the processor is further configured to call the operation instructions to execute steps of:

step M1, calculating the stored signature module private key and a terminal public key in the PIN code setting instruction to obtain a first calculation value, performing hash operation on the first calculation value, and taking a hash result as the shared key;

step M2, performing hash-based message authentication code (HMAC) operation on the first ciphertext in the PIN code setting instruction by using the shared key to obtain a second operation result, and intercepting data in first 16 bytes of the second operation result to obtain the intercepted data; and step M3, determining whether the intercepted data is consistent with first result data in the PIN code setting instruction, if yes, the verifying is successful; otherwise, the verifying is failed.

17. The apparatus according to claim 16, wherein the processor is further configured to call the operation instructions to execute steps of:

step N1, decrypting the first ciphertext in the PIN code setting instruction by using the shared key to obtain a first decrypted value, removing padding data in the first decrypted value to obtain a password intermediate value;

step N2, determining whether the password intermediate value is less than a first preset value, if yes, reporting an error; otherwise, executing step N3; and step N3, performing hash operation on the password intermediate value to obtain a hash result, and intercepting data in first 16 bytes of the hash result and storing the intercepted data as the PIN code.

18. The apparatus according to claim 17, the processor is further configured to call the operation instructions to execute steps of:

when a PIN verification signature data acquisition instruction is received, verifying the PIN verification signature data acquisition instruction, if the verifying is successful, generating the first PIN verification signature data and sending the first PIN verification signature data to the terminal; and if the verifying is failed, ending.

19. The apparatus according to claim 18, wherein the processor is further configured to call the operation instructions to execute steps of:

step R1, calculating a terminal public key in the PIN verification signature data acquisition instruction and the stored signature module private key to obtain a first calculation value, performing hash operation on the first calculation value to obtain a first hash value and taking the first hash value as the shared key;

step R2, performing decryption operation on first result data in the PIN verification signature data acquisition instruction by using the shared key to obtain second result data, obtaining a PIN code stored internally, and converting the PIN code stored internally to second byte stream data, performing hash operation on the second byte stream data and intercepting data in first 16 bytes of a hash result to obtain intercepted data; and step R3, determining whether the second result data is consistent with the intercepted data, if yes, the verifying is successful; otherwise, the verifying is failed, and regenerating a signature module key pair and replacing the stored signature module key pair.

20. The apparatus according to claim 18, wherein the processor is further configured to call the operation instructions to execute steps of: encrypting the first PIN verification signature data by using the shared key to obtain a ciphertext data, and returning the ciphertext data to the terminal.

* * * * *